(12) United States Patent
Choi

(10) Patent No.: US 10,890,947 B2
(45) Date of Patent: Jan. 12, 2021

(54) DISPLAY DEVICE

(71) Applicant: LG Display Co., Ltd., Seoul (KR)

(72) Inventor: Taejin Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/718,587

(22) Filed: Dec. 18, 2019

(65) Prior Publication Data

US 2020/0201394 A1 Jun. 25, 2020

(30) Foreign Application Priority Data

Dec. 24, 2018 (KR) .......................... 10-2018-0168444

(51) Int. Cl.
*G06F 1/16* (2006.01)
*H05K 5/00* (2006.01)
*G09F 9/30* (2006.01)

(52) U.S. Cl.
CPC ............ *G06F 1/1652* (2013.01); *G09F 9/301* (2013.01); *H05K 5/0017* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,506,726 | B2* | 12/2019 | Kang | .................. H01L 51/5237 |
| 2018/0160554 | A1* | 6/2018 | Kang | .................. H01L 51/0097 |
| 2019/0098774 | A1* | 3/2019 | Park | ........................ G09F 9/301 |
| 2020/0068728 | A1* | 2/2020 | Kang | .................. H05K 5/0017 |
| 2020/0137902 | A1* | 4/2020 | Park | ..................... H05K 5/0017 |

FOREIGN PATENT DOCUMENTS

KR 20-2014-0002205 4/2014
KR 10-2018-0045980 A 5/2018

* cited by examiner

*Primary Examiner* — Lisa Lea-Edmonds
(74) *Attorney, Agent, or Firm* — Seed IP Law Group LLP

(57) ABSTRACT

A rollable displace device is provided. The rollable display device includes a flexible display assembly coupled to a roller that is configured to be wound and unwound around the roller. When the display panel is wound around the roller, the display panel is received in a housing. When the display panel is unwound from the roller, the display panel extends from the housing. The display device includes at least one support link coupled to the display panel and configured to extend and contract in response to the unwinding and winding of the display panel, respectively. The at least one support link supports the display panel in the unwound state and reduces or prevents overturning of the display panel in the unwound state.

16 Claims, 14 Drawing Sheets

DISPLAY DEVICE

CROSS-REFERENCE TO RELATED APPLICATIONS

This application claims the priority of Korean Patent Application No. 10-2018-0168444, filed Dec. 24, 2018, in the Korean Intellectual Property Office, the disclosure of which is incorporated herein by reference, in its entirety.

BACKGROUND

Technical Field

The present disclosure relates to a display device, and more particularly, to a rollable display device which is capable of reducing overturning of a display panel.

Description of the Related Art

As display devices which are used for a monitor of a computer, a television, or a cellular phone, there are an organic light emitting display device (OLED), which is a self-emitting device, and a liquid crystal display device (LCD), which utilizes a separate light source.

An applicable range of these types of display devices includes personal digital assistants as well as monitors of computers and televisions. Display devices with larger display area and a reduced volume and weight are being studied.

Further, recently, a rollable display device which is manufactured by forming a display unit and a wiring line on a flexible substrate such as plastic which is a flexible material configured to display images even though the display device is rolled is getting attention as a next generation display device. However, such rollable display devices can be prone to overturning due to the forces associated with rolling and unrolling the display device, which is a considerable safety hazard for viewers and increases the likelihood of damage to the display device.

BRIEF SUMMARY

In various embodiments, the present disclosure provides a display device which reduces overturning of the display panel when the display panel is wound or unwound, using a structure which supports the display panel.

In one or more embodiments, the present disclosure provides a display device which improves the safety and the driving reliability of larger display devices and display panels by suppressing or reducing overturning of the display panel due to a force generated while winding or unwinding the display panel.

The embodiments of the present disclosure are not limited to the above-mentioned examples, and other embodiments, which are not mentioned above, can be clearly understood by those skilled in the art from the following description.

Other detailed matters of the embodiments of the present disclosure are included in the detailed description and the drawings.

According to the present disclosure, a support link which supports the display panel is disposed on a rear surface of the display panel to reduce the overturning risk of the display panel due to a weight of the display panel and rolling rigidity of the display panel.

According to the present disclosure, the support link has a simple structure and configuration and is used to enhance the safety and the driving reliability of the display device.

For example, in one or more embodiments of the present disclosure, a display devices is provided that includes: a housing; a roller coupled to the housing; a flexible display assembly coupled to the roller, the flexible display assembly including a first surface and a second surface opposite the first surface, wherein the flexible display assembly is manipulatable between a rolled configuration wherein the flexible display assembly is wound about the roller and an unrolled configuration wherein the flexible display assembly is unwound from the roller; and a support rod coupled between the display panel and the housing.

The display device further includes: the support rod including a plurality of rods, a first one of the plurality of rods telescopically received in a second one of the plurality of rods, the second one of the plurality of rods configured to extend and collapse relative to the first one of the plurality of rods; the support rod being extendible between a collapsed configuration corresponding to the rolled configuration of the flexible display assembly and an extended configuration corresponding to the unrolled configuration of the flexible display assembly, wherein in the collapsed configuration, a majority of a length of the first one of the plurality of rods is received in the second one of the plurality of rods, and wherein in the extended configuration, the majority of the first one of the plurality of rods extends from the second one of the plurality of rods.

The display device further includes: a friction member coupled to the second one of the plurality of rods and in contact with the first one of the plurality of rods; a head bar coupled to the flexible display assembly; a link assembly coupled to the head bar, the link assembly including a plurality of links rotatably coupled to each other, wherein the link assembly is manipulatable between a folded configuration corresponding to the rolled configuration of the flexible display assembly and an unfolded configuration corresponding to the unrolled configuration of the flexible display assembly; a motor coupled to the roller and configured to rotate the roller; a shaft coupled to the motor, the motor configured to rotate the shaft; and a ball screw assembly coupled to the shaft, the shaft configured to translate the ball screw assembly along the shaft, wherein translation of the balls screw assembly along the shaft manipulates the link assembly between the folded and unfolded configurations.

The display device further includes: the support rod further including a plurality of rods, a first one of the plurality of rods telescopically received in a second one of the plurality of rods, each of the first one and the second one of the plurality of rods including an end, the support rod further including an elastic member coupled between the end of the first one of the plurality of rods and the end of the second one of the plurality of rods; the flexible display assembly further includes a flexible display panel configured to display images, a flexible film on the flexible display panel, a printed circuit board coupled to the flexible film, and a back cover on the display panel, the flexible film, and the printed circuit board, the back cover including a plurality of openings configured to contract when the flexible display assembly is in the rolled configuration and configured to expand when the flexible display assembly is in the unrolled configuration; and the flexible display assembly further includes a display panel, the display panel including a substrate, a buffer layer on the substrate, a pixel assembly on the buffer layer, an encapsulation layer on the pixel assembly, and an encapsulation substrate on the encapsulation layer.

In one or more embodiments of the present disclosure, a display system includes: a housing; a roller coupled to the housing; a display assembly coupled to the roller and having a first surface and a second surface opposite the first surface; a head bar coupled to the second surface of the display assembly; a first link assembly coupled to the head bar and the housing, wherein the first link assembly includes a plurality of links including a first pair of links rotatably coupled to each other with a first hinge and a second pair of links rotatably coupled to each other with a second hinge; and a support rod coupled to the housing and configured to support the display assembly.

The system further includes: the support rod being coupled between the housing and a first one of the first pair of links disposed further from the second surface of the display assembly than a first one of the second pair of links; the support rod being coupled between the housing and the head bar.

The system further includes: a second link assembly coupled to the head bar and the housing, wherein the second link assembly includes a plurality of links including a first pair of links rotatably coupled to each other with a first hinge and a second pair of links rotatably coupled to each other with a second hinge; and a sliding structure assembly coupled between the first and second link assemblies, where the sliding structure assembly includes a first member and a plurality of second members, each of the plurality of second members configured to slide to be received in the first member or to extend from the first member.

The system further includes: the display assembly further including a display panel, the display panel including a substrate, a buffer layer on the substrate, a pixel assembly on the buffer layer, an encapsulation layer on the pixel assembly, an encapsulation substrate on the encapsulation layer, and a first adhesive layer between the encapsulation substrate and the encapsulation layer, the display assembly further including a back cover on the encapsulation substrate and a second adhesive layer between the back cover and the encapsulation substrate; and a slide rail coupled to the head bar, and a slider coupled to the slide rail and the first link assembly, the slider configured to translate along the slide rail.

In one or more embodiments, a display device is provided that includes: a housing having a support; a roller coupled to the housing; a flexible display assembly coupled to the roller, the flexible display assembly configured to be wound and unwound around the roller; a support rod coupled between the flexible display assembly and the support of the housing; and a motion converting assembly coupled to the support of the housing, the motion converting assembly including a shaft and a ball screw assembly coupled to the shaft.

The display device further includes: a motor configured to rotate the roller and the shaft, wherein the ball screw assembly is configured to translate along the shaft corresponding in response to rotation of the shaft; a head bar coupled to the flexible display assembly; a plurality of links coupled between the head bar and the support of the housing, the plurality of links including a first link coupled to the ball screw assembly; a plurality of links coupled to the flexible display assembly and the support of the housing, the support rod coupled to a first one of the plurality of links; and a head bar coupled to the flexible display assembly, a slide rail coupled to the head bar, and a slider coupled to the slide rail and the first one of the plurality of links.

The effects according to the present disclosure are not limited to the examples above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
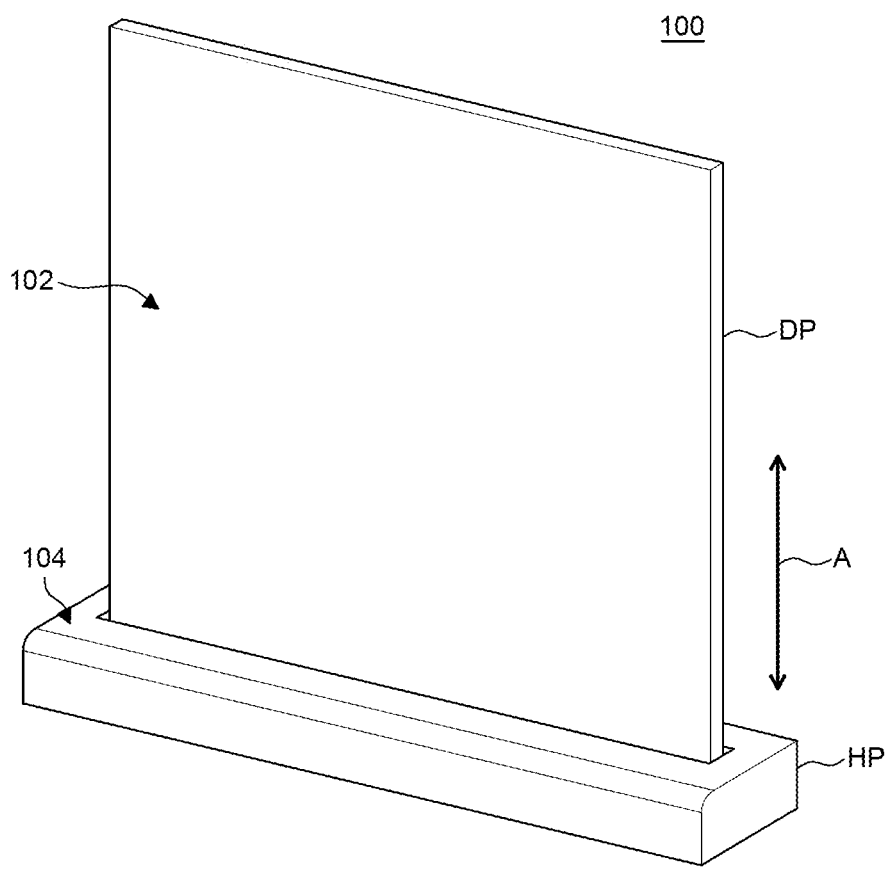
FIG. 1A is a schematic perspective view of a display device in an unrolled configuration according to one embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or there between.

Although the terms "first," "second," and the like are used for describing various components, these components are not confined by these terms. These terms are merely used for distinguishing one component from the other components. Therefore, a first component mentioned below may be a second component in a technical concept of the present disclosure.

Like reference numerals generally denote like elements throughout the specification.

A size and a thickness of each component illustrated in the drawings is for convenience of description only, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to one or more embodiments of the present disclosure will be described in detail with reference to the accompanying drawings.

Rollable Display Device

In one embodiment, a rollable display device, which may also be referred to herein as a display device, is provided which is capable of displaying images even though the display device is in the rolled configuration. The rollable display device has high flexibility as compared with a general display device of the related art. A size and a shape of the rollable display device is selected according to whether the rollable display is in use or not. Specifically, when the rollable display device is not in use, the rollable display device is rolled to be stored with a reduced volume. In contrast, when the rollable display device is in use, the rolled rollable display device is unfolded or unrolled to form a preferably flat and planar viewing surface.

Figure 1B:
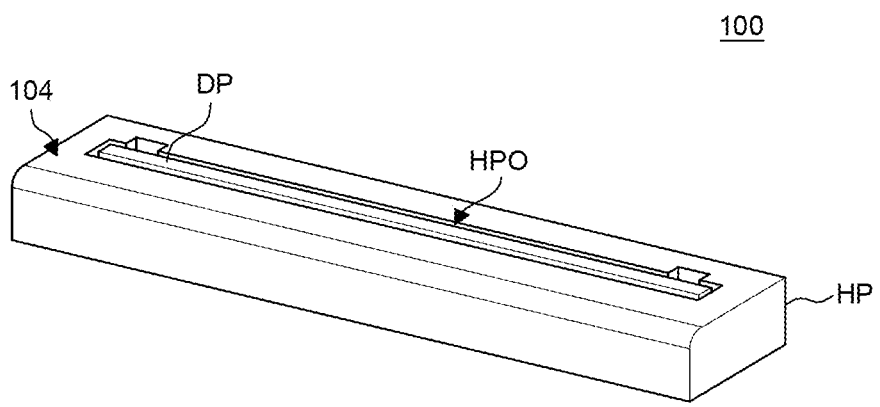
FIG. 1B is a schematic perspective view of the display device of FIG. 1A in a rolled configuration according to one embodiment of the present disclosure.

FIGS. 1A and 1B are schematic perspective views of a display device 100 according to one or more embodiments of the present disclosure. Referring to FIGS. 1A and 1B, the display device 100 includes a display assembly DP (which may be referred to herein as a display unit DP) and a housing HP (which may be referred to herein as a housing unit HP).

The display unit DP is configured to display images to a user and for example, in one embodiment of the display unit DP, a display element and a circuit, a wiring line, and a component for driving the display element are disposed in the display unit DP. Since the display device 100 according to one or more embodiments of the present disclosure is a rollable display device 100, the display unit DP is configured to be wound and unwound. Put another way, the display unit DP is manipulatable between a rolled (FIG. 1B) and an unrolled configuration (FIG. 1A). For example, in one embodiment, the display unit DP is formed of a display panel and a back cover, each having flexibility to be wound or unwound. The display unit DP, including the display panel and the back cover, will be described below in more detail with reference to FIGS. 4 and 5.

The housing unit HP is a case in which the display unit DP is accommodated. When the display unit DP is wound, the display unit DP is accommodated in the housing unit HP and when the display unit DP is unwound, the display unit DP is disposed outside the housing unit HP, or in other words, extends from the housing unit HP.

The housing unit HP has an opening HPO to allow the display unit DP and a support rod 180 (see FIG. 2), which may be referred to herein as a support link 180, to move to the inside and the outside of the housing unit HP. The display unit DP and the support link 180 move in a vertical direction through the opening HPO of the housing unit HP. The support link 180 will be described in more detail herein with reference to FIGS. 6A to 7, among others.

In one or more embodiments, the display unit DP of the display device 100 is manipulatable from a fully unwound state to a fully wound state or from a fully wound state to a fully unwound state. In other words, the display unit DP is configured to translate between the fully unwound state to the fully wound state and vice versa as indicated by arrow A in FIG. 1A. The fully unwound state may be referred to herein as a fully unrolled configuration and the fully wound state may be referred to herein as a fully rolled configuration. Moreover, in one embodiment, the display unit DP can be selectively translated to any position between the fully unwound state and the fully wound state.

FIG. 1A illustrates the display unit DP of the display device 100 in the fully unwound state. In the fully unwound state, the display unit DP of the display device 100 is disposed outside of the housing unit HP. That is, in order for a user to watch images on the display device 100, the display unit DP is unwound. In the fully unwound state, as shown in FIG. 1A, the display unit DP extends from the housing unit HP as much as possible and cannot be further unwound anymore without uncoupling from the housing unit HP. In other words, the display unit DP includes a first surface 102, which in an embodiment, is a viewing surface 102 for displaying images to a user or viewer, as described herein. As such, the first surface 102 may be referred to herein as a front surface 102.

FIG. 1B illustrates the display unit DP of the display device 100 in the fully wound state. In the fully wound state, the display unit DP of the display device 100 is accommodated in the housing unit HP and cannot be further wound. In other words, when the display device 100 is not in use (e.g. the user is not watching images on the display device 100), it is advantageous in terms of design aesthetic that the display unit DP is not disposed outside of the housing unit HP, but rather, is received in the housing unit HP. Therefore, when the display unit DP is wound to the fully wound state, the display unit DP is accommodated in the housing unit HP. As such, the fully wound state corresponds to a configuration of the display unit DP where the display unit DP is received or accommodated in the housing unit HP such that the display unit DP does not extend above a first surface 104 of the housing unit HP, which in an embodiment, is a top or upper surface 104 of the housing unit HP. Further, when the display unit DP is in the fully wound state and accommodated in the housing unit HP, a volume of the display device 100 is reduced and the display device 100 is more easily transportable.

The display device 100 further includes a driving assembly (which may be referred to herein as a driving unit) which winds the display unit DP from a fully unwound state to the fully wound state and vice versa.

Driving Assembly

Figure 2:
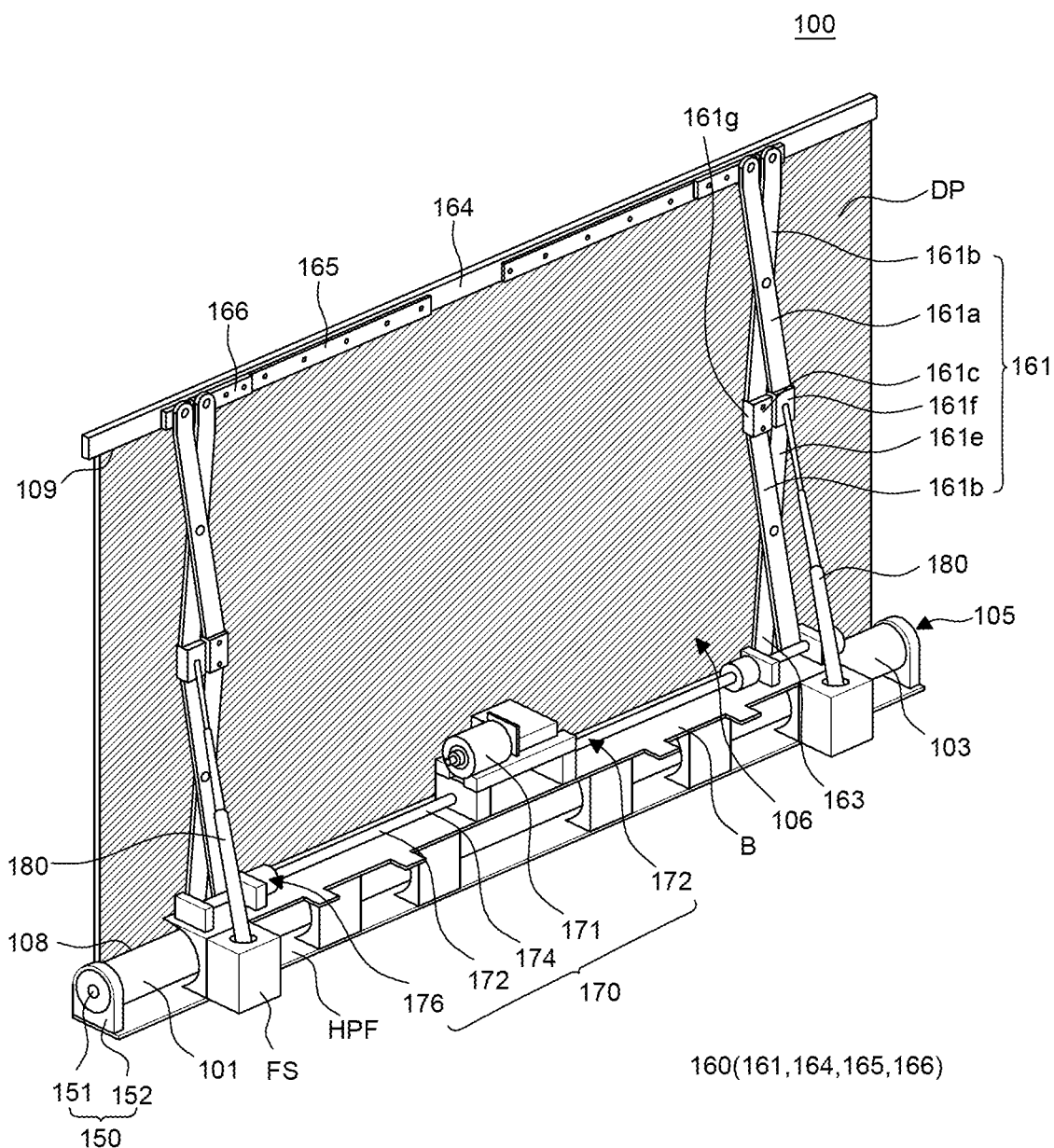
FIG. 2 is a perspective view of the display device of FIG. 1A according to one embodiment of the present disclosure.
Figure 3:
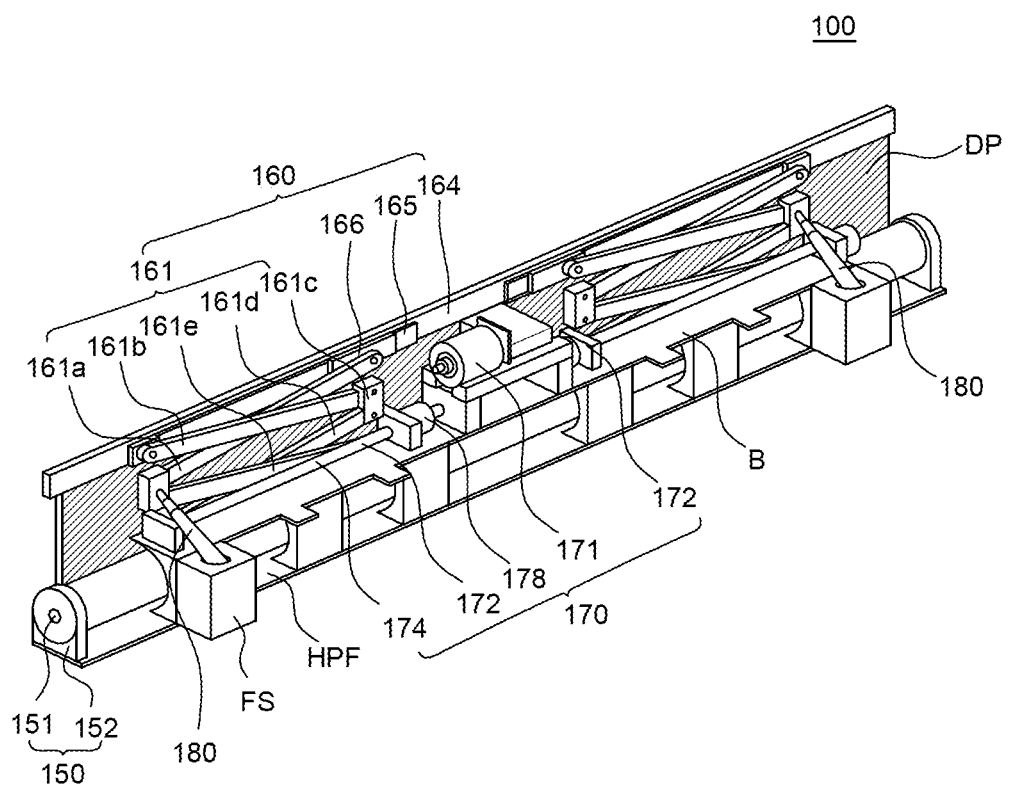
FIG. 3 is a perspective view of the display device of FIG. 1B according to one embodiment of the present disclosure.

FIG. 2 is a perspective view of the display device 100 according to one or more embodiments of the present disclosure. FIG. 3 is a perspective view of the display device 100 according to one or embodiments of the present disclosure. FIG. 2 is a perspective view of the display unit DP in the fully unwound state and FIG. 3 is a perspective view of the display unit DP in the fully wound state.

First, referring to FIGS. 2 and 3, a driving unit MP (which may be referred to herein as a driving assembly MP) includes a roller assembly 150 (which may be referred to herein as a roller unit 150), a lifting assembly 160 (which may be referred to herein as a lifting unit 160), and a motion converting assembly 170 (which may be referred to herein as a motion converting unit 170).

The display unit DP is coupled or fixed to the roller unit 150. The roller unit 150 rotates in a clockwise direction or a counterclockwise direction to wind or unwind the display unit DP about the roller unit 150, as described herein. The roller unit 150 includes a roller 151 and a roller support 152 (which may be referred to herein as a roller support unit 152). The display unit DP is coupled to the roller 151 and the roller support unit 152 couples the roller 151 to the housing unit HP (FIGS. 1A and 1B) to support the roller 151, as described herein.

The roller 151 is a member around which the display unit DP is wound. In one embodiment, the roller 151 has a cylindrical shape, although other shapes and configurations of the roller 151 are expressly contemplated herein, such as an ovular shape or a square shape with or without rounded edges, for example. A first edge 108 of the display unit DP is fixed or coupled to the roller 151. In one embodiment, the first edge 108 is a lower edge 108 of the display unit DP. When the roller 151 rotates, the display unit DP, which is fixed to the roller 151 through the lower edge 108, is wound around the roller 151. In contrast, when the roller 151 rotates in an opposite direction, the display unit DP, which is wound around the roller 151, is unwound from the roller 151.

The roller support unit 152 supports the roller 151 at both sides 101, 103 of the roller 151. In other words, the roller 151 includes a first side 101 and a second side 103 opposite the first side 101, and the display device 100 includes a pair of roller support units 152 with one support unit 152 coupled to each side 101, 103 of the roller 151. The roller support unit 152 is disposed on a bottom surface HPF of the housing unit HP. An upper portion 105 (which may be referred to herein as an upper side surface 105) of the roller support unit 152 is coupled to both ends of the roller 151. Therefore, the roller support units 152 support the roller 151 in spaced relationship from the bottom surface HPF of the housing unit HP. In one embodiment, the roller 151 is rotatably coupled to the roller support unit 152. As such, the roller 151 is coupled to the bottom surface HPF of the housing unit HP via the roller support units 152. While FIG. 2 illustrates two roller support units 152, it is be appreciated that embodiments of the present disclosure include more or less than two roller support units 152, such as a single roller support unit 152, or three, four, five, six, or more roller support units 152.

The lifting unit 160 translates the display unit DP along a selected path. In one embodiment, the lifting unit 160 translates the display unit DP in a vertical direction relative to the bottom surface HPF of the housing unit HP in conjunction with rotation of the roller unit 150, and more specifically, the roller 151. The lifting unit 160 includes a link assembly 161 (which may be referred to herein as a link unit 161), a head bar 164, a slide rail 165, and a slider 166.

The link unit 161 of the lifting unit 160 includes a plurality of links 161a, 161b, 161d, 161e and a plurality of hinges 161c (which may be collectively referred to herein as a hinge unit 161c) coupled to and connecting the plurality of links 161a, 161b, 161d, 161e. Specifically, the plurality of links 161a, 161b, 161d, 161e includes a first link 161a and a second link 161b wherein the first link 161a and the second link 161b are rotatably coupled to each other and cross each other in the form of scissors when the display unit DP is in the unwound configuration. The plurality of links 161a, 161b, 161d, 161e further includes a third link 161d and a fourth link 161e rotatably coupled to each other in a similar configuration to the first and second links 161a, 161b. The hinge unit 161c includes a first hinge 161f and a second hinge 161g, wherein the first hinge 161f is rotatably coupled to the first link 161a and the fourth link 161e and the second hinge 161g is rotatably coupled to the second link 161b and the third link 161d.

When the link unit 161 moves in the vertical direction, the first and second pairs of links 161a, 161b and 161d, 161e rotate such that the individual links of each pair are far away from each other or close to each other. Put another way, movement of the link unit 161 in the vertical direction moves the pairs of links 161a, 161b and 161d, 161e from a folded or horizontal configuration where the links are at a first angle to horizontal (see FIG. 3) to an unfolded vertical configuration where the links are a second angle to horizontal (see FIG. 2). In this embodiment, the first angle is less than the second angle.

The head bar 164 of the lifting unit 160 is fixed or coupled to a second edge 109 of the display unit DP. In one embodiment, the second edge 109 is an upper edge 109 of the display unit DP. The head bar 164 is coupled to the link unit 161 to move the display unit DP in the vertical direction in accordance with the rotation and translation of the plurality of links 161a, 161b, 161d, 161e of the link unit 161. That is, the display unit DP moves in the vertical direction via the head bar 164 and the link unit 161.

The head bar 164 covers only a portion of a surface of the display unit DP which is adjacent to an uppermost edge of the display unit DP so as not to block or obstruct an image displayed on the front surface 102 of the display unit DP. In one embodiment, the head bar 164 is coupled to the display unit DP with a screw or other fastener, but the present disclosure is not limited thereto.

The slide rail 165 of the lifting unit 160 defines a movement path of the plurality of links 161a, 161b, 161d, 161e, and more particularly of the first link 161a. The first link 161a is rotatably fastened with the slide rail 165 so that motion of the first link 161a is guided along a path defined by the slide rail 165. More specifically, the first link 161a is fastened with the slider 166 and the slider 166 is coupled to the slide rail 165 such that the slider 166 moves along a path defined by the slide rail 165. In one embodiment, the second link 161b is coupled to the slider 166 and the slide rail 165 instead of the first link 161a.

The motion converting unit 170 includes a motor 171 and a rotary device 172 (which may be referred to herein as a rotary unit 172). The motor 171 is fixed to a portion of a base B (which may be referred to herein as a base unit B) coupled to the bottom surface HPF of the housing unit HP. The motor 171 is connected to a power generation source (which may be referred to herein as a power generating unit), such as a separate external power source or a built-in battery, which supplies power to the motor 171. The motor 171 generates a torque to provide a driving force to the rotary unit 172.

The rotary unit 172 is connected to the motor 171 and is configured to convert rotational motion from the motor 171 into a linear reciprocating motion. That is, the rotational motion of the motor 171 is converted into the linear reciprocating motion by a structure fixed to the rotary unit 172. For example, the rotary unit 172 includes a shaft 174 and a ball screw assembly 176 including a nut 178 which is fastened with the shaft 174 and translates along the shaft 174 according to a direction of rotation of the shaft 174 (e.g., clockwise or counterclockwise), but is not limited thereto.

For example, the motor 171 includes an output and one or more gears coupled to the output. In one embodiment, the gears of the motor 171 are coupled to threads on the shaft 174. As such, rotation of the output of the motor 171 rotates the gears, which rotates the shaft 174. Rotation of the shaft 174 results in translation of the ball screw assembly 176 along the shaft 174, either towards or away from the motor 171 depending on the direction of rotation of the output of the motor 171 (e.g. clockwise or counterclockwise). In one embodiment, operation of the motor 171 clockwise translates the ball screw assembly 176 towards the motor 171 along shaft 174, while in other embodiments, operation of the motor 171 clockwise translates the ball screw assembly 176 away from the motor 171 along shaft 174. In one embodiment, operation of the motor 171 counterclockwise translates the ball screw assembly 176 towards the motor 171 along the shaft 174, while in other embodiments, operation of the motor 171 counterclockwise translates the ball screw assembly 176 away from the motor 171 along the shaft 174. As such, the configuration of the motor 171 and the translation of the ball screw assembly 176, and thus the link unit 161, can be selected according to a design of the driving unit MP.

The motion converting unit 170 operates in conjunction with the lifting unit 160 to lift and lower the display unit DP (which includes a display panel 120, as described herein). The link unit 161 of the lifting unit 160 includes a link structure to receive the driving force from the motion converting unit 170 to repeatedly perform a folding or unfolding operation of the plurality of links 161a, 161b, 161d, 161e. When the display unit DP is fully wound around the roller 151, the link unit 161 of the lifting unit 160 maintains a folded state. That is, when the unit DP is fully wound around the roller 151, the lifting unit 160 has a minimum dimension, which is a minimum height in an embodiment. When the display unit DP is fully unwound from the roller 151, the link unit 161 of the lifting unit 160 maintains an unfolded state. That is, when the display unit DP is fully unwound from the roller 151, the lifting unit 160 has a maximum dimension, which is a maximum height in an embodiment.

The winding process of the display unit DP will be described with reference to FIGS. 2 and 3. In order to wind the display unit DP from the fully unwound state illustrated in FIG. 2 to the fully wound state illustrated in FIG. 3, the roller 151 rotates so that the display unit DP is wound around the roller 151. Further, in order to supply additional force, the motor 171 of the motion converting unit 170 is operated. As the motor 171 operates, the rotary unit 172 undergoes a linear motion. That is, the ball screw assembly 176 of the rotary unit 172, to which a first end 163 of the fourth link 161e is connected undergoes a linear motion along the shaft 174 of the rotary unit 172. Therefore, the first end 163 of the fourth link 161e moves towards the motor 171 and thus the plurality of links 161a, 161b, 161d, 161e are folded so that the height of the link unit 161 is reduced. Further, while the plurality of links 161a, 161b, 161d, 161e are folded, the head bar 164 connected to the first link 161a is also lowered and the upper edge 109 of the display unit DP connected to the head bar 164 is also lowered toward the bottom surface HPF of the housing unit HP. As such, the display unit DP is wound by the above-described process.

The unwinding process of the display unit DP will now be described. In order to unwind the display unit DP to the fully unwound state illustrated in FIG. 2 from the fully wound state illustrated in FIG. 3, the roller 151 rotates so that the display unit DP is unwound from the roller 151. Further, in order to supply an additional force, the motor 171 of the motion converting unit 170 is operated. As the motor 171 operates, the structure of the rotary unit 172 undergoes linear motion. That is, the ball screw assembly 176 of the rotary unit 172 to the first end 163 of the fourth link 161e is connected undergoes linear motion. Therefore, the first end 163 of the fourth link 161e moves to be spaced apart from the motor 171 and thus the plurality of links 161a,161b, 161d, 161e are unfolded so that the height of the link unit 161 is increased. Further, while the plurality of links 161a, 161b, 161d, 161e are unfolded, the head bar 164 connected to the first link 161a is also lifted and the upper edge 109 of the display unit DP connected to the head bar 164 is also lifted. As such, the display unit DP is unwound by the above-described process.

Referring to FIGS. 2 and 3, the lower edge 108 of the display unit DP is coupled to the roller 151. Therefore, the roller 151 rotates in opposite directions so that the display unit DP is wound around the roller 151 or the display unit DP is unwound from the roller 151. In one or more embodiments, the driving unit MP has a different structure and configuration than the above-described driving unit MP. That is, as long as the display unit DP is wound and unwound, the above-described configuration of the roller unit 150, the lifting unit 160, and the motion converting unit 170 can be selected according to a design of the display device 100. Moreover, the driving unit MP can be modified or altered to provide further embodiments. Some features of the embodiment of the driving unit MP described above have been omitted for clarity and to avoid obscuring features of the described embodiments.

Display Unit

Figure 4:
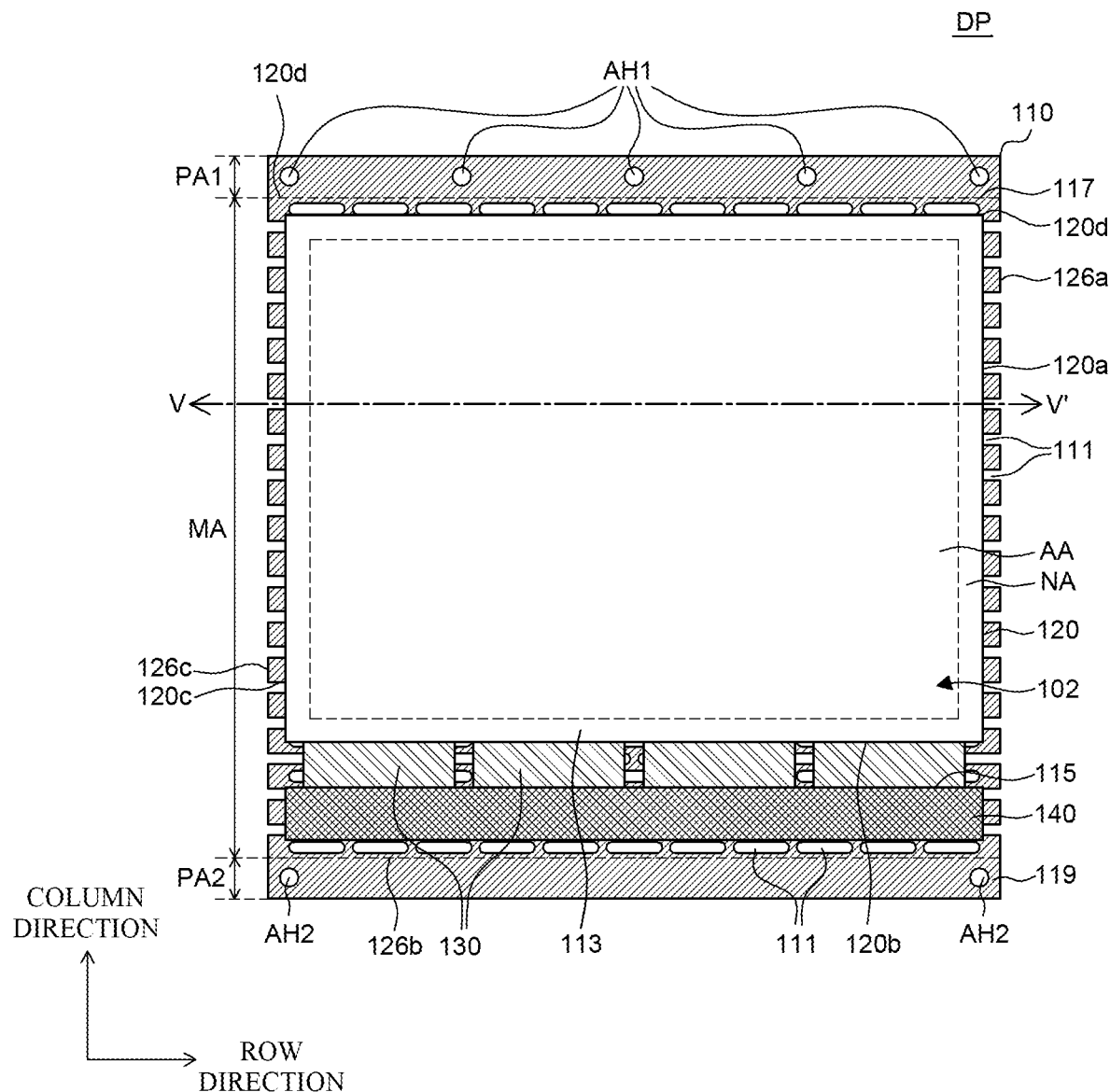
FIG. 4 is a plan view of a display assembly of the display device of FIGS. 1A and 1B according to one embodiment of the present disclosure.
Figure 5:
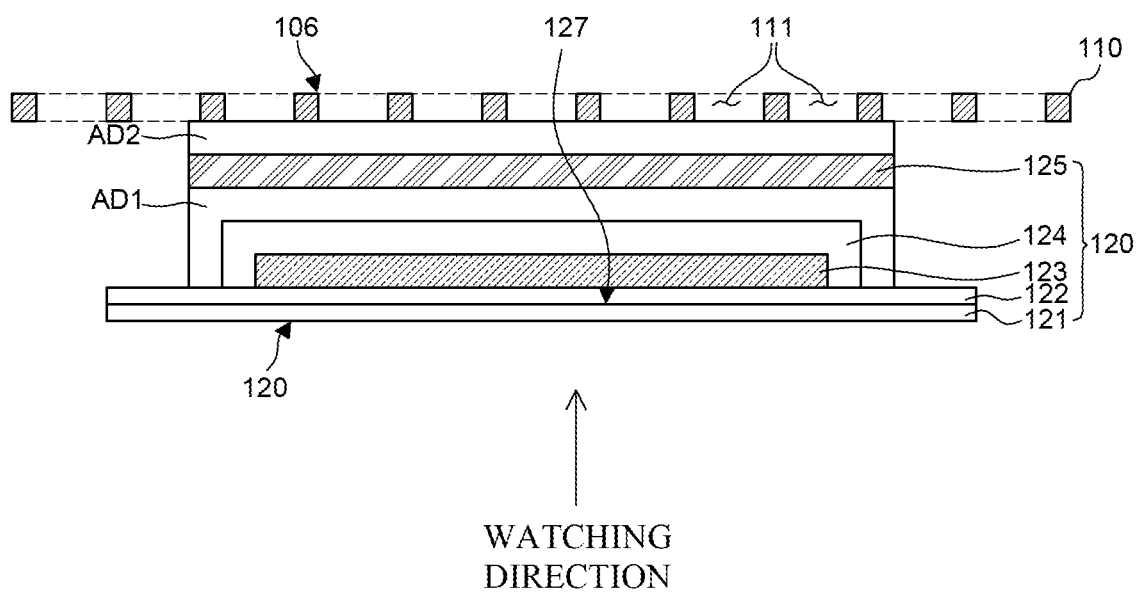
FIG. 5 is a cross-sectional view taken along line V-V' of FIG. 4.

FIG. 4 is a plan view of the display unit DP of the display device 100 according to one or more embodiments of the present disclosure. FIG. 5 is a cross-sectional view taken along line V-V' of FIG. 4. The display unit DP of the display device 100 includes the front surface 102 as well as a second surface 106 (which may be referred to herein as a rear surface 106) opposite the front surface 102.

Referring to FIG. 4, the display unit DP includes a back cover 110, a display panel 120, a flexible film 130, and a printed circuit board 140.

The display panel 120 is a panel for displaying images to a user. For example, in one or more embodiments, the display panel 120 includes a display element which displays images, a driving element which drives the display element, and wiring lines which transmit various signals to the display element and the driving element. The display element can be selectively configured depending on a type of the display panel 120. For example, when the display panel 120 is an organic light emitting display panel, the display element is an organic light emitting diode which includes an anode, an organic light emitting layer, and a cathode. Alternatively, when the display panel 120 is a liquid crystal display panel, the display element is a liquid crystal display element. The following description will proceed under the assumption that the display panel 120 is an organic light emitting display panel, although it is to be appreciated that the display panel 120 is not limited to organic light emitting display panels. Further, since the display device 100 according to one or more embodiments of the present disclosure is a rollable display device, the display panel 120 may be implemented as any flexible display panel capable of being wound around or unwound from the roller 151.

The display panel 120 includes a display area AA and a non-display area NA. The non-display area NA surrounds the display area AA. Put another way, the non-display area NA extends around a periphery of the display area AA. Said differently, the non-display area NA extends along an entire perimeter of the display area AA. In FIG. 4, the boundary between the display area AA and the non-display area NA is indicated with a dashed line.

The display area AA is an area in the display panel 120 where images are displayed. The display area AA includes a plurality of sub pixels and a plurality of pixels corresponding to the plurality of sub pixels. A circuit for driving the plurality of sub pixels is disposed in the display area AA, in an embodiment. The plurality of sub pixels is minimum units which configure the display area AA and a display element is disposed in each of the plurality of sub pixels. For example, an organic light emitting diode which includes an anode, an organic light emitting layer, and a cathode is disposed in each of the plurality of sub pixels in embodiments where the display panel 120 is an organic light emitting display panel, but the display panel 120 is not limited thereto. Further, a circuit for driving the plurality of sub pixels preferably includes a driving element and a wiring line. For example, in one embodiment, the circuit includes a thin film transistor, a storage capacitor, a gate line, and a data line, but is not limited thereto.

The non-display area NA is an area of the display panel 120 where no image is displayed. In the non-display area NA, various wiring lines and circuits for driving the organic light emitting diodes of the display area AA are disposed. For example, in one or more embodiments of the non-display area NA, a link line which transmits signals to the plurality of sub pixels and circuits of the display area AA or a driving IC such as a gate driver IC or a data driver IC are disposed, but the non-display area NA is not limited thereto.

The flexible film 130 is a film in which various components are disposed on a base film. The flexible film 130 is malleable and flexible and is electrically connected to the display panel 120. In operation, the flexible film 130 supplies a signal to the plurality of sub pixels and the circuits of the display area AA. In an embodiment, the flexible film 130 is disposed at one end, such as first end 113, of the non-display area NA of the display panel 120 to supply a power voltage or a data voltage to the plurality of sub pixels and the circuits of the display area AA. Even though four flexible films 130 are illustrated in FIG. 4, the number of flexible films 130 can be selected according to design preference and is therefore not limited thereto.

A driving integrated circuit (IC), such as a gate driver IC or a data driver IC, for example, is disposed on the flexible film 130. The driving IC is a component which processes data for displaying images and a driving signal for processing the data. In alternative embodiments, the driving IC is disposed on the flexible film 130 by a chip on glass (COG), a chip on film (COF), or a tape carrier package (TCP) technique depending on a selected mounting method. However, for the convenience of description, it is described that the driving IC is mounted on the flexible film 130 by a chip on film technique, but the embodiments of the present disclosure are not limited thereto.

The printed circuit board 140 is disposed at one end, such as first end 115, of the flexible film 130 and connected to the flexible film 130. The printed circuit board 140 is a component which supplies signals to the driving IC. The printed circuit board 140 supplies various signals such as a driving signal or a data signal to the driving IC. Various components may be disposed on the printed circuit board 140 in alternative embodiments. For example, a timing controller or a power source (which may be referred to herein as a power source unit) are disposed on the printed circuit board 140. Even though one printed circuit board 140 is illustrated in FIG. 4, it is to be understood that the number of printed circuit boards 140 can be selected according to the design of the display unit DP and the selected functionality of the printed circuit boards 140, and therefore the present disclosure is not limited to the illustrated embodiment.

The back cover 110 is disposed on rear surfaces of the display panel 120, the flexible film 130, and the printed circuit board 140 to support the display panel 120, the flexible film 130, and the printed circuit board 140. Therefore, the back cover 110 is preferably larger in size than the display panel 120. The back cover 110 protects the above-referenced components, as well as other components of the display unit DP from harmful outside forces or contaminants. Even though the back cover 110 is formed of a rigid material relative to the flexible film 130 and the display panel 120, at least a portion of the back cover 110 has sufficient flexibility to be wound or unwound together with the display panel 120. For example, in alternative embodiments, the back cover 110 is formed of a metal material such as stainless steel (including of various grades), invar or plastic. However, if the material of the back cover 110 satisfies physical conditions such as a thermal strain amount, a radius of curvature, and rigidity, the material may be selected according to design preference, and is therefore not limited to the above examples.

The back cover 110 includes a support portion PA (which may be referred to herein as a support area PA) and a malleable portion MA (which may be referred to herein as a malleable area MA). Specifically, the back cover 110 includes a first support portion PA1 (which may be referred to herein as a first support area PA1) of a first end 117 of the back cover 110. In one embodiment, the first end 117 is an uppermost end of the back cover 110. The back cover 110 further includes a second support portion PA2 (which may be referred to herein as a second support area PA2) of a second end 119 of the back cover 110. In one embodiment, the second end 119 is a lowermost end of the back cover 110. The malleable area MA extends between the first support area PA1 and the second support area PA2. The boundary between the malleable area MA and the first and second support areas PA1, PA2 is indicated by dashed lines.

The first support area PA1 of the back cover 110 is an uppermost area of the back cover 110 and is fastened to the head bar 164. The first support area PA1 includes first fastening holes AH1 aligned with the head bar 164 to receive fasteners to secure the first support area PA1 to the head bar 164. For example, as described in detail with reference to FIG. 3, screws pass through the head bar 164 and the first fastening holes AH1 and are disposed to fasten the head bar 164 with the first support area PA1 of the back cover 110. Since the first support area PA1 is fastened with the head bar 164, when the link unit 162 fastened with the head bar 164 is lifted or lowered, the back cover 110 is also lifted and lowered together with the display panel 120, which is attached to the back cover 110. Even though five first fastening holes AH1 are illustrated in FIG. 4, the number of first fastening holes AH1 is not limited thereto. Further, even though it is described that the back cover 110 is fastened to the head bar 164 using the first fastening holes AH1 in FIG. 4, it is not limited thereto, but rather the back cover 110 and the head bar 164 may be fastened with each other without using a separate fastening hole, such as with an adhesive, or other fastening devices and materials, for example.

The second support area PA2 of the back cover 110 is a lowermost area of the back cover 110 and is fastened to the roller 151. The second support area PA2 includes second fastening holes AH2 aligned with the roller 151 to receive fasteners. For example, screws pass through the roller 151 and the second fastening holes AH2 and are disposed to fasten the roller 151 and the second support area PA2 of the back cover 110 with each other. Since the second support area PA2 is fastened with the roller 151, the back cover 110 is wound around, or unwound from, the roller 151 by the rotation of the roller 151. Even though two second fastening holes AH2 are illustrated in FIG. 4, the number of second fastening holes AH2 is not limited thereto. Further, even though it is described that the back cover 110 is fastened with the roller 151 using the second fastening holes AH2 in FIG. 4, it is not limited thereto and the back cover 110 and the roller 151 may be fastened with each other without using a separate fastening hole, such as with an adhesive, or other fastening devices and materials, for example.

The malleable area MA of the back cover 110 is an area which is wound around or unwound from the roller 151 together with the display panel 120. The malleable area MA preferably overlaps at least the display panel 120 as well as other components of the display unit DP. In other words, the malleable area MA is preferably greater than an area of the display panel 120. As such, in one embodiment, edges 126a, 126b, 126c, 126d of the malleable area MA extend beyond edges 120a, 120b, 120c, 120d of the display panel 120.

A plurality of openings 111 is disposed in the malleable area MA of the back cover 110. When the display unit DP is wound or unwound, the plurality of openings 111 are deformed by a stress which is applied to the display unit DP. Specifically, when the display unit DP is wound or unwound, the malleable area MA of the back cover 110 is deformed as the plurality of openings 111 contract or expand. Further, as the plurality of openings 111 contract or expand, a slip phenomenon of the display panel 120 disposed on the malleable area MA of the back cover 110 is reduced so that the stress which is applied to the display panel 120 is reduced.

Referring to FIG. 5, the display panel 120 includes a substrate 121, a buffer layer 122, a pixel assembly 123 (which may be referred to herein as a pixel unit 123), an encapsulation layer 124, and an encapsulation substrate 125.

The substrate 121 is a base member for supporting various components of the display panel 120. In one embodiment, the substrate 121 is an insulating material. The substrate 121 is formed of a material having flexibility to allow the display panel 120 to be wound or unwound. For example, the substrate 121 is formed of a plastic material such as polyimide PI, in an embodiment.

The buffer layer 122 suppresses moisture and/or oxygen which permeates from an exterior of the substrate 121 from being diffused. In one embodiment, the buffer layer 122 is a single layer, while in other embodiments, the buffer layer includes two layers. Each of the layers may include silicon oxide (SiOx) or silicon nitride (SiNx), alone or in combination, but the present disclosure is not limited thereto. For example, in alternative embodiments, the buffer layer 122 includes more than two layers and other materials besides silicon oxide and silicon nitride The pixel unit 123 includes a plurality of organic light emitting diodes and a circuit for driving the plurality of organic light emitting diodes. In one embodiment, the pixel unit 123 has an area corresponding to the display area AA. The organic light emitting diode includes an anode, an organic light emitting layer, and a cathode.

The anode supplies holes to the organic light emitting layer and is preferably formed of a conductive material having a high work function. For example, the anode may be formed of tin oxide (TO), indium tin oxide (ITO), indium zinc oxide (IZO), or indium zinc tin oxide (ITZO), alone or in combination, in alternative embodiments, but is not limited thereto.

The organic light emitting layer is supplied with holes from the anode and supplied with electrons from the cathode to emit light. In alternative embodiments, the organic light emitting layer is formed of a red organic light emitting layer, a green organic light emitting layer, a blue organic light emitting layer, and a white organic light emitting layer depending on a color of light selected to be emitted from the organic light emitting layer. In one embodiment where the organic light emitting layer is a white organic light emitting layer, color filters having various colors are disposed in the display panel 120 to filter the white light to one or more colors, such as red, blue, or green.

The cathode supplies electrons to the organic light emitting layer and is formed of a conductive material having a low work function. For example, the cathode may be formed of at least one selected from a group consisting of metals such as magnesium (Mg), silver (Ag), and aluminum (Al), and alloys thereof, alone or in combination in alternative embodiments, but the present disclosure is not limited thereto.

Further, the display panel 120 may be configured as a top emission type panel or a bottom emission type panel, depending on a selected emission direction of light emitted from the organic light emitting diode.

With the top emission type panel, light emitted from the organic light emitting diode is emitted to an upper portion of the substrate 121 on which the organic light emitting diode is disposed. In the case of the top emission type panel, a reflective layer is formed below the anode to allow the light emitted from the organic light emitting diode to travel to the upper portion of the substrate 121, that is, toward the cathode.

With the bottom emission type panel, light emitted from the organic light emitting diode is emitted to a lower portion of the substrate 121 on which the organic light emitting diode is disposed. In the case of the bottom emission type panel, the anode is formed of a transparent conductive material to allow the light emitted from the organic light emitting diode to travel to the lower portion of the substrate 121 and the cathode is formed of the metal material having high reflectivity.

Hereinafter, for the convenience of description, the description will proceed by assuming that the display device 100 is a display device with a bottom emission type display panel, but the present disclosure is not limited thereto.

A circuit for driving the organic light emitting diode is disposed in the pixel unit 123. In one embodiment, the circuit is formed of a thin film transistor, a storage capacitor, a gate line, a data line, and a power line. However, the configuration of the circuit can be selected according to the design of the display device 100 and as such, the configuration in alternative embodiments may be different.

The encapsulation layer 124 covers the pixel unit 123 and is disposed on the pixel unit 123. The encapsulation layer 124 seals the organic light emitting diode of the pixel unit 123. The encapsulation layer 124 protects the organic light emitting diode of the pixel unit 123 from moisture, oxygen, and other adverse impacts of outside or external forces or contaminants. The encapsulation layer 124 is formed by alternately laminating a plurality of inorganic layers and a plurality of organic layers. For example, the inorganic layer may be formed of an inorganic material such as silicon nitride (SiNx), silicon oxide (SiOx), and aluminum oxide AlOx, alone or in combination, and the organic layer may be formed of epoxy or acrylic polymer, alone or in combination, but the present disclosure is not limited thereto.

The encapsulation substrate 125 is disposed on the encapsulation layer 124. The encapsulation substrate 125 protects the organic light emitting diode of the pixel unit 123 together with the encapsulation layer 124. For example, the encapsulation substrate 125 protects the organic light emitting diode of the pixel unit 123 from moisture, oxygen, and other adverse impacts of outside or external forces or contaminants. The encapsulation substrate 125 is preferably formed of a metal material, which has high corrosion resistance and is easily processed in the form of foil or thin film, such as aluminum (Al), nickel (Ni), chromium (Cr), and an alloy of iron (Fe) and nickel, alone or in combination. Therefore, because the encapsulation substrate 125 is formed of a metal material, the encapsulation substrate 125 is implemented as a thin film with high resistance to external impacts and scratches.

A first adhesive layer AD1 is disposed between the encapsulation layer 124 and the encapsulation substrate 125. The first adhesive layer AD1 bonds the encapsulation layer 124 and the encapsulation substrate 125 to each other. The first adhesive layer AD1 is formed of an adhesive material such as a thermosetting or natural curable type adhesive. For example, the first adhesive layer AD1 may be formed of an optical clear adhesive (OCA) or a pressure sensitive adhesive (PSA) in alternative embodiments, but is not limited thereto.

The first adhesive layer AD1 is disposed to enclose or surround the encapsulation layer 124 and the pixel unit 123. That is, the pixel unit 123 is sealed by the buffer layer 122 and the encapsulation layer 124, and the encapsulation layer 124 and the pixel unit 123 are sealed by the buffer layer 122 and the first adhesive layer AD1. The first adhesive layer AD1 protects the organic light emitting diode of the pixel unit 123 from moisture, oxygen, and other adverse impacts of outside or external forces or contaminants together with the encapsulation layer 124 and the encapsulation substrate 125. In one embodiment, the first adhesive layer AD1 further includes an absorbent. The absorbent includes particles having hygroscopicity that absorb moisture and oxygen from the outside to reduce permeation of the moisture and oxygen into the pixel unit 123. The back cover 110 is disposed on the encapsulation substrate 125. The back cover 110 is disposed in contact with the encapsulation substrate 125 of the display panel 120 to protect the display panel 120. In order to protect the display panel 120, the back cover 110 is preferably formed of a material having rigidity.

In one or more embodiments, the back cover 110 includes a plurality of openings 111. The plurality of openings 111 provides flexibility to the back cover 110. In operation (e.g. when winding or unwinding the display panel), the plurality of openings 111 are flexibly deformed and allow the back cover 110 to be wound around the roller 151 or unwound from the roller 151 together with the display panel 120.

A second adhesive layer AD2 is disposed between the encapsulation substrate 125 and the back cover 110. The second adhesive layer AD2 bonds the encapsulation substrate 125 and the back cover 110 to each other. The second adhesive layer AD2 is formed of an adhesive material, such as a thermosetting or natural curing adhesive. For example, the second adhesive layer AD2 may be formed of an optical clear adhesive (OCA) or a pressure sensitive adhesive (PSA) in alternative embodiments, but is not limited thereto.

In the embodiment illustrated in FIG. 5, the plurality of openings 111 of the back cover 110 are not filled with the second adhesive layer AD2. However, in other embodiments, the second adhesive layer AD2 fills a part or all of the plurality of openings 111. If the second adhesive layer AD2 fills part or all of the plurality of openings 111 of the back cover 110, a contact area between the second adhesive layer AD2 and the back cover 110 is increased such that the likelihood of separation between the back cover 110 and the second adhesive layer AD2 is reduced.

In one embodiment, a translucent film is further disposed on a rear surface 127 of the substrate 121. The translucent film protects the front surface 102 of the display panel 120 or reduces the reflection of external light incident onto the display panel 120. For example, the translucent film may be at least one of polyethyleneterephthalate (PET) film, an anti-reflection film, a polarizer film, and a transmittance controllable film, but is not limited thereto. In one embodiment, the translucent film includes multiple layers, with each layer having one of the above characteristics or configurations. In one embodiment, a flexible display assembly includes the display unit DP, the head bar 164 and the link unit 161. In an alternative embodiment, a flexible display assembly includes the display unit DP, the head bar 164, the link unit 161 and a slide structure 1262 (see FIG. 12).

Driving of Support Link

Figure 6A:
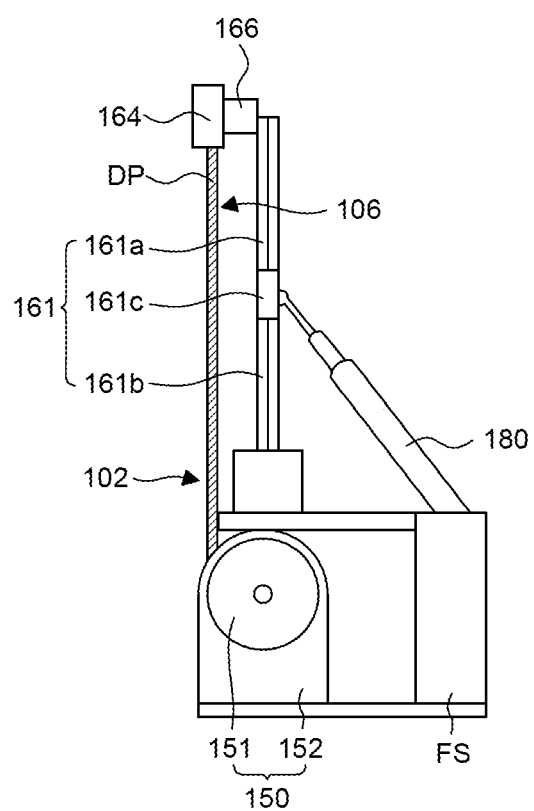
FIGS. 6A and 6B are side views of the display device of FIGS. 1A and 1B according to one embodiment of the present disclosure.
Figure 6B:
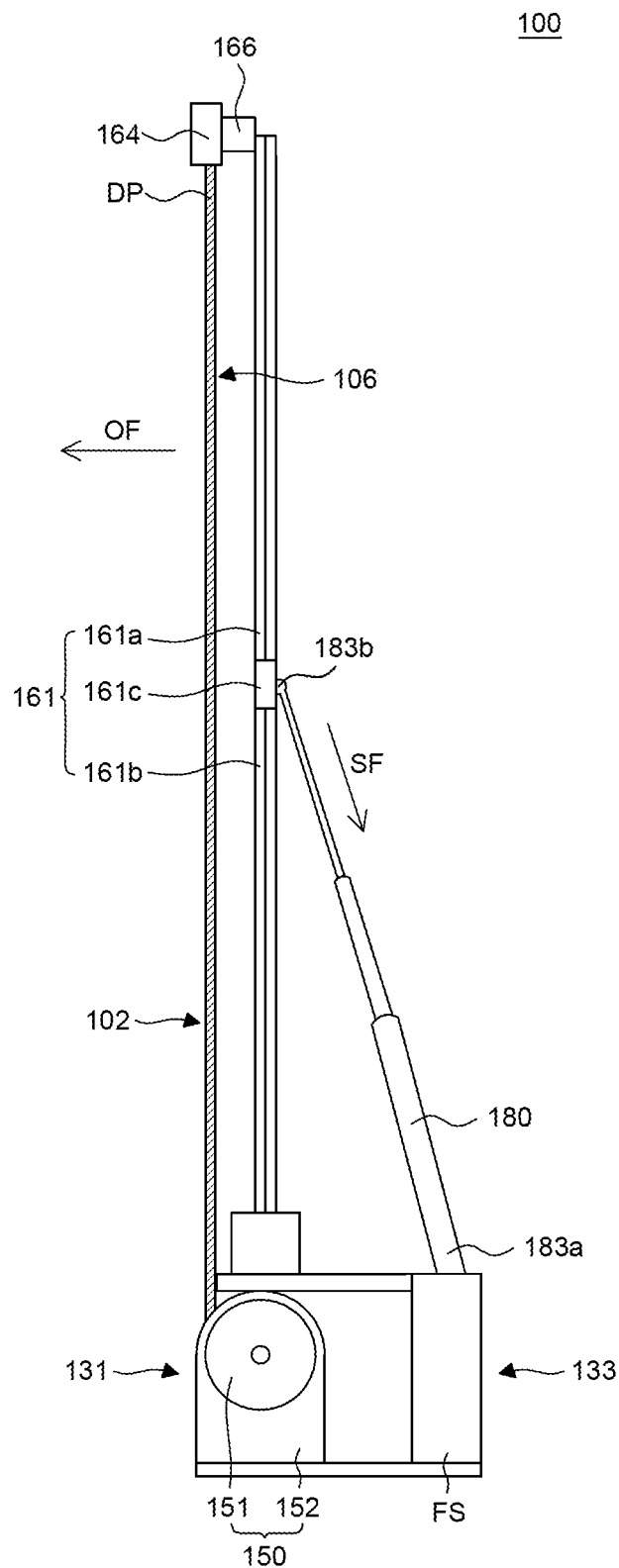
Figure 7:
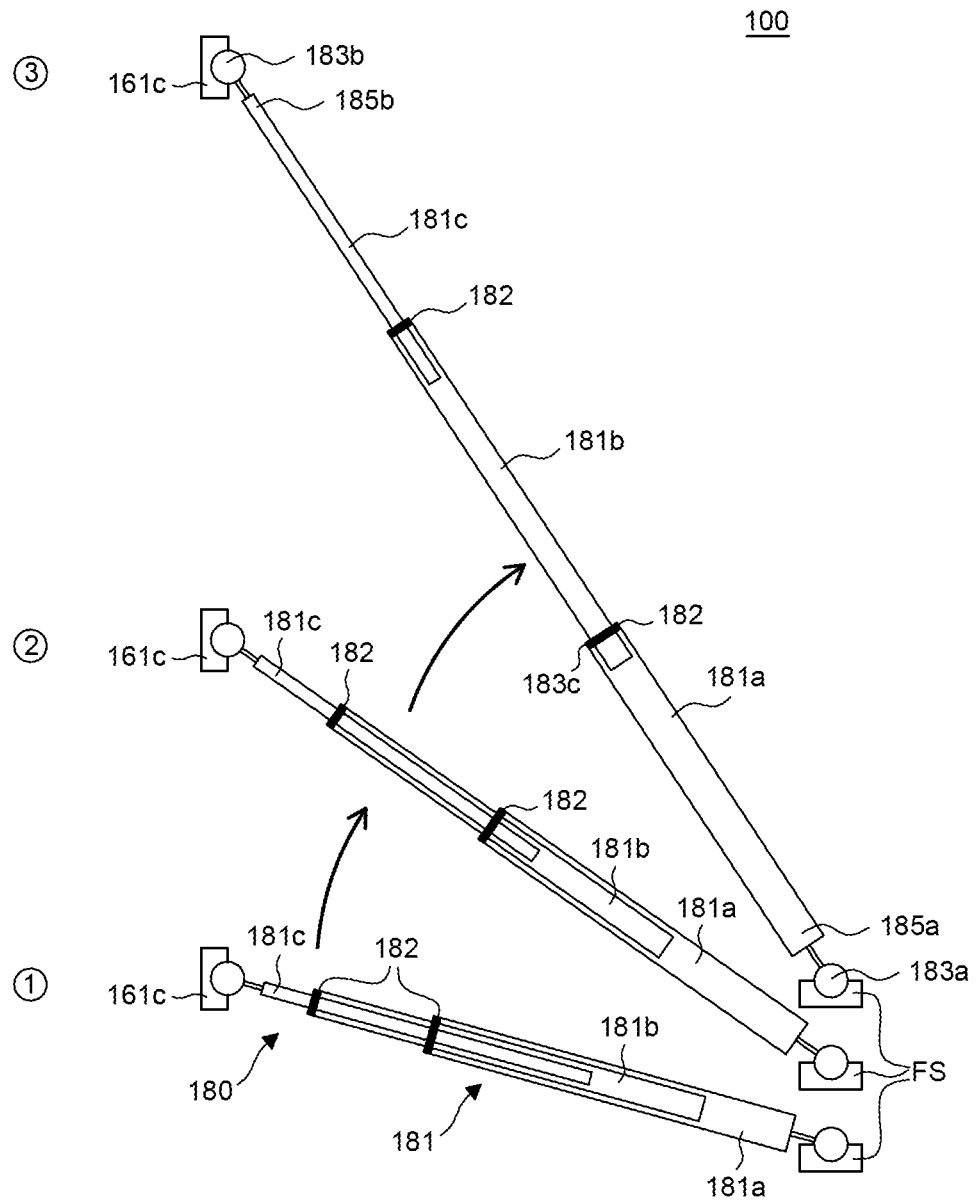
FIG. 7 is a cross-sectional view of a support rod of the display device of FIGS. 1A and 1B according to one embodiment of the present disclosure.

FIGS. 6A and 6B are side views of the display device 100 according to one or more embodiments of the present disclosure. FIG. 7 is a cross-sectional view of the support rod 180 (which may be referred to herein as a support link 180) of the display device 100 according to one or more embodiments of the present disclosure. Specifically, FIG. 6A is a side view illustrating the display unit DP of the display device 100 in the fully wound configuration. FIG. 6B is a side view illustrating the display unit DP of the display device 100 in the fully unwound configuration. FIG. 7 is a cross-sectional view for explaining a process of manipulating the display unit DP between the fully wound state and the fully unwound state. For the convenience of description, in FIG. 7, only the support link 180, the hinge unit 161c, and a fixing member FS are schematically illustrated, although it is to be appreciated that the same are incorporated into the display device 100 as described herein.

Referring to FIGS. 6A and 7, when the display unit DP is fully wound, the support link 180 is disposed to have a minimum length. Specifically, when the display unit DP is fully wound as in FIG. 6A, the support link is in the state (1) of FIG. 7, wherein a plurality of rods 181 of the support link 180 slide towards the fixing member FS a maximum amount, such that the support link 180 has the minimum length. Further, most of the area of the display unit DP is wound around the roller 151 so that the display unit DP is accommodated in the housing unit HP. In other words, the portion of the display unit DP that extends from the roller 151 in the fully wound configuration is preferably less than a height of the housing unit HP so that the display unit DP does not extend from the housing unit HP in the fully wound state.

Referring to FIGS. 6B and 7, when the display unit DP is fully unwound, the support link 180 is disposed to have a maximum length. Specifically, when the display unit DP is fully unwound as in FIG. 6B, the support link 180 is in the state (3) of FIG. 7, wherein the plurality of rods 181 of the support link 180 slide away from the fixing member FS a maximum amount, such that the support link 180 has the maximum length. When the display unit DP is fully unwound, the display unit DP is disposed outside of the housing unit HP or extending from the housing unit HP with a maximum length, such that a force for overturning the display unit DP to the front surface 102 of the display unit DP is generated. Therefore, the support link 180 is disposed to have the maximum overall length to support the rear surface 106 of the display unit DP.

Referring to FIGS. 6A and 6B, the support link 180 includes the fixing member FS. Specifically, a second end 183b of the support link 180 is connected to the hinge unit 161c and a first end 183a opposite the second end 183b is connected to the fixing member FS to support the display unit DP through the link unit 161, as described herein.

Referring to FIG. 7, the support link 180 includes the plurality of rods 181. The plurality of rods 181 are configured to slide from adjacent rods. In other words, the plurality of rods 181 are configured in a telescoping arrangement wherein adjacent rods are extendible and collapsible relative to each other, except for an outermost rod. For example, the plurality of rods 181 includes a first rod 181a, a second rod 181b, and a third rod 181c, each with a longitudinal axial bore. The first rod 181a has a first diameter and the second rod 181b has a second diameter less than the first diameter such that the second rod 181b is slidably received in the first rod 181a, and more specifically, the longitudinal axial bore of the first rod 181a. Put another way, the first rod 181a is configured to receive the second rod 181b when the longitudinal axial bore of the first rod 181a has a diameter greater than the second diameter of the second rod 181b.

The third rod 181c has a third diameter that is less than the second diameter of the second rod 181b such that the third rod 181c is slidably received in the longitudinal axial bore of the second rod 181b. In other words, the second rod 181b is configured to receive the third rod 181c when the longitudinal axial bore of the second rod 181b has a diameter greater than the third diameter of the third rod 181c. As such, the third rod 181c is formed to have the third diameter, which is smaller than the second diameter of the second rod 181b so that the third rod 181c is slidably received in the second rod 181b. Thus, each rod of the plurality of rods 181 preferably includes the second rod 181b slidably engaged with the first rod 181a and the third rod 181c slidably engaged with the second rod 181b. As such, the second rod 181b can slide in and out of the first rod 181a and the third rod 181c can slide in and out of the second rod 181b. The plurality of rods 181 preferably have a hollow cylindrical shape, but are not limited thereto. Even though the plurality of rods 181 includes three rods in FIG. 7, the number of the plurality of rods 181 can be selected depending on the design of the support link 180 and is therefore not limited thereto.

Referring to FIG. 7, both ends 183a, 183b of the support link 180 have a ball bearing (which may be referred to herein as a ball bearing shape). Put another way, the first and second ends 183a, 183b of the support link 180 are formed to have a ball bearing shape such that they are configured to be fixed to the hinge unit 161c and the fixing member FS, respectively. The ball bearings are disposed at an end 185a of the first rod 181a and an end 185b of the third rod 181c of the support link 180. The ball bearings are rotatably coupled to the hinge unit 161c and the fixing member FS and as such, the support link 180 may rotate at the end 185a of the first rod 181a connected to the fixing member FS and the end 185b of the third rod 181c connected to the hinge unit 161c of the link unit 161. Even though the hinge unit 161c of the link unit 161 connected to the support link 180 moves in a vertical direction and in a horizontal direction, the support link 180 supports the display unit DP without being separated from the hinge unit 161c and the fixing member FS by extension of the plurality of rods 181 and rotation of the first and third rods 181a, 181c about the fixing member FS and the hinge unit 161c, respectively.

Referring to FIG. 7, the support link 180 further includes a friction member 182. The friction member 182 is disposed at an end 183c of at least one of the plurality of rods 181 of the support link 180. In the illustrated embodiment, the first rod 181a includes the end 185a connected to the fixing member FS, which may be referred to as a first end 185a, and the end 183c, which may be referred to herein as a second end 183c of the first rod 181a. Specifically, the friction member 182 is disposed at the second end 183c of the first rod 181a, which provides a space that accommodates another rod, such as second rod 181b in a sliding or telescoping relationship. In one embodiment, a second friction member 182 is disposed at an end of the second rod 181b where the second rod 181b receives the third rod 181c. For example, the friction member 182 is disposed at the second end 183c of the first rod 181a where the first rod 181a slidably receives the second rod 181b and/or the end of the second rod 181b where the second rod 181b slidably receives the third rod 181c. However, the present disclosure is not limited thereto and the friction member 182 may be disposed in an arbitrary position in a space between the adjacent rods 181 rather than the end of the plurality of rods 181. As such, a friction member 182 may be disposed at each junction between adjacent rods of the plurality of rods 181 to provide frictional forces, as described herein.

The overall length of the support link 180 changes as the display unit DP is lifted and lowered. Specifically, when the display unit DP is fully wound, the support link 180 has the minimum length. Further, as the display unit DP is unwound, the length of the support link 180 is gradually increased. Therefore, when the display unit DP is fully unwound, the support link 180 extends to have the maximum length.

Referring to FIG. 7, the friction member 182 of the support link 180 provides a frictional force between adjacent rods 181. Specifically, when the display unit DP is unwound, the plurality of rods 181 slide to increase the overall length of the support link 180. For example, the second rod 181b slides from the first rod 181a and the third rod 181c slides from the second rod 181b. In the fully unwound state of the display unit DP when the support link 180 has the maximum length, the risk of overturning of the display unit DP is reduced by the support link 180. More specifically, the friction member 182 of the support link 180 provides a frictional force so that the adjacent rods 181 do not slide and thus the support link 180 supports the display unit DP. It is to be appreciated that the support link 180 reduces the likelihood of overturning of the display unit DP due to the distribution of forces in embodiments of the present disclosure with the support link 180 compared to display devices without the support link 180, as described herein.

Hereinafter, referring to FIG. 7, a process of manipulating the display unit DP from the fully wound state of the display to the fully unwound state will be described in detail. In FIG. 7, the fully wound state of the display unit DP in which the support link 180 has the minimum length is denoted by the state (1), the fully unwound state of the display unit DP in which the support link 180 has the maximum length is denoted by the state (3), and a transition state between the fully wound state and the fully unwound state of the display unit DP is denoted by a state (2).

Referring to FIG. 7, in the state (1), the display unit DP is fully wound so that in the state (1), a majority of at least one of the plurality of rods 181 of the support link 180 is disposed in an adjacent rod. For example, the majority of the second rod 181b is disposed in the first rod 181a and a portion of the second rod 181b which is not disposed in the first rod 181a extends from the first rod 181a. As such, the second rod 181b is nested within the first rod 181a in a telescoping configuration. Further, the majority of the third rod 181c is disposed in the second rod 181b and a portion of the third rod 181c which is not disposed in the second rod 181b extends from the second rod 181b in a nested or telescoping configuration. In the state (1), the display unit DP is fully wound, so that the support link 180 has the minimum length.

Referring to FIG. 7, in the state (2), each of the plurality of rods 181 of the support link 180 slide from the adjacent rod 181. Specifically, the state (2) represents a point in time wherein the display unit DP is manipulated from the fully wound state to the fully unwound state so that the overall length of the support link 181 is increased. Therefore, the second rod 181b slides from the first rod 181a and the third rod 181c slides from the second rod 181b. If in the state (2), the unwinding operation is terminated, the friction member 182 of the support link 180 provides a frictional force so that adjacent rods 181 do not slide and thus the length of the support link 180 is fixed to support the display unit DP. In other words, the state (2) corresponds to a configuration of the support link 180 when the display unit DP is between the fully unwound and the fully wound configurations and vice versa.

Referring to FIG. 7, in the state (3), the display unit DP is fully unwound so that in the state (3), each of the plurality of rods 181 of the support link 180 slide from adjacent rods 181 a maximum amount, such that the support link 180 has the maximum length. Specifically, the second rod 181b slides from the first rod 181a a maximum amount and the third rod 181c slides from the second rod 181b a maximum amount so that the support link 180 has the maximum overall length. In this case, the friction member 182 provides a frictional force so that the adjacent rods 181 do not slide and thus the length of the support link 180 is fixed to the maximum length to support the display unit DP in the fully unwound state.

The process of switching to the state (1) from the state (3) via the state (2) is a reverse process of the process of switching to the state (3) from the state (1) via the state (2), and as such, redundant description will be omitted. In other words, an opposite, but otherwise similar procedure to that described above is performed to manipulate the support link 180 from the maximum length in state (3) to the minimum length in state (1) via the transition state (2) corresponding to manipulation of the display unit DP from the fully unwound state to the fully wound state.

In the case of rollable display devices, the display unit is unwound by pushing a link using a torque of a motor. Therefore, as the length of a part of the display unit which is unwound and disposed outside of the housing unit is increased, the likelihood of overturning the display unit in a direction towards the front surface is increased. Therefore, rollable display devices are likely to overturn toward the front surface in some configurations.

Further, in some rollable display devices, the force supplied by the motor during the unwinding process is insufficient such that a separate torsion spring is inserted into the roller around which the display unit is wound and an elastic force of the torsion spring is added to the force from the motor to increase the force applied to the display unit to unwind the display unit. However, the elastic force from the torsion spring increases the risk that the display unit will overturn towards the front surface. Further, when the size of the display unit is increased, a height of the display unit disposed outside of the housing unit is increased. Therefore, a possibility that the display unit will overturn towards the front surface is further increased. Further, when the display unit is repeatedly wound and unwound, wrinkling caused by separation of the display panel and the back cover may occur. When wrinkling or separation occurs, the possibility that the display unit is inclined to the front surface is increased, which increases the likelihood of overturning of the display unit towards the front surface.

In the display device 100 according to one or more embodiments of the present disclosure, the support link 180 is connected to the hinge unit 161c of the link unit 161 so that when the display device 100 is unwound, the likelihood of overturning of the display unit DP is reduced. Specifically, when the display device 100 is wound or unwound, the support link 180 supports the display unit DP by pulling the display unit DP towards the rear surface 106. Therefore, in the display device 100 according to the present disclosure, when the display device 100 is wound or unwound using the support link 180, overturning of the display unit DP is reduced and the safety and the driving reliability of the display device 100 is increased.

Further, in the display device 100 according to one or more embodiments of the present disclosure, both ends 183a, 183b of the support link 180 have the ball bearing shape so that the support link 180 may freely move with respect to the hinge unit 161c and the fixing member FS. Specifically, when the display device 100 is wound or unwound, the hinge unit 161c connected to the support link 180 may move not only in the vertical direction, but also in the horizontal direction via the connection between the ball bearing shape and the hinge unit 161c. In one embodiment, when both ends 183a, 183b of the support link 180 do not include the ball bearing shape, if the hinge unit 161c moves in the horizontal direction, a connected portion of the hinge unit 161c and the support link 180 and a connected portion of the support link 180 and the fixing member FS may be damaged. Therefore, in the display device 100 according to one or more embodiments of the present disclosure, both ends 183a, 183b of the support link 180 have the ball bearing shape so that when the display device 100 is wound or unwound, even though the hinge unit 161c moves in the horizontal direction, the display unit DP remains supported without damage to any of the components, such as the connected portion of the hinge unit 161c and the support link 180.

Further, in the display device 100 according to one or more embodiments of the present disclosure, the friction member 182 is disposed between the plurality of adjacent rods 181 of the support link 180 to reduce overturning of the display unit DP when the display device 100 is fully unwound. Specifically, when the display unit DP is fully unwound, the display unit DP tends to overturn towards the front surface 102 of the display unit DP. As described above, the support link 180 supports the rear surface 106 of the display unit DP to reduce overturning of the display unit DP. That is, the support link 180 provides a preferably equal and opposite supporting force to suppress the force tending to overturn the display unit DP. The support force is generated by the plurality of rods 181 of the support link 180. Therefore, the friction member 182 is disposed between adjacent rods of the plurality of rods 181 of the support link 180 to provide a frictional force so that the overall length of the support link 180 is not reduced during operation, which maintains the support force of the support link 180, which reduces overturning of the display unit DP.

Put another way, the support link 180 of the display device 100 of embodiments of the present disclosure reduces or prevents overturning of the device 100 by providing a force that tends to counteract an overturning force when the display device 100 is manipulated to the fully unwound state. In FIG. 6B, the display unit DP and the link unit 161 are located proximate a front 131 of the display device 100. Because the display unit DP and the link unit 161 together have a weight that is greater than the remaining components of the display device 100, the display device 100 tends to overturn towards the front surface 102 of the display unit DP. Put another way, gravity exerts an overturning force OF in a first direction relative to the front surface 102, as illustrated. The support link 180 exerts a suppression force SF in a second direction corresponding to the arrangement of the support link 180. The suppression force SF counteracts the overturning force OF because the second direction is, at least in part, opposite to the first direction, meaning that the second direction is an angular force that includes a horizontal and vertical component, wherein the horizontal component of the second direction is opposite the first direction.

Preferably, the suppression force SF, in combination with its angular orientation relative to the overturning force OF, is sufficient to counteract the overturning force OF to reduce or prevent overturning of the display unit DP. As such, the support link 180 distributes forces on the display unit 180 to reduce the likelihood that the display unit DP will overturn towards the front surface 102. In one embodiment, the display device 100 does not include the support link 180, but rather, one or more counterweights are provided in the housing unit HP instead of the support link 180, such as in a location corresponding to the fixing member FS, or other locations spaced from the front surface 102 of the display unit DP, for example, to provide a counterbalancing force to reduce overturning of the display unit DP.

Support Link Including Compressor

Figure 8:
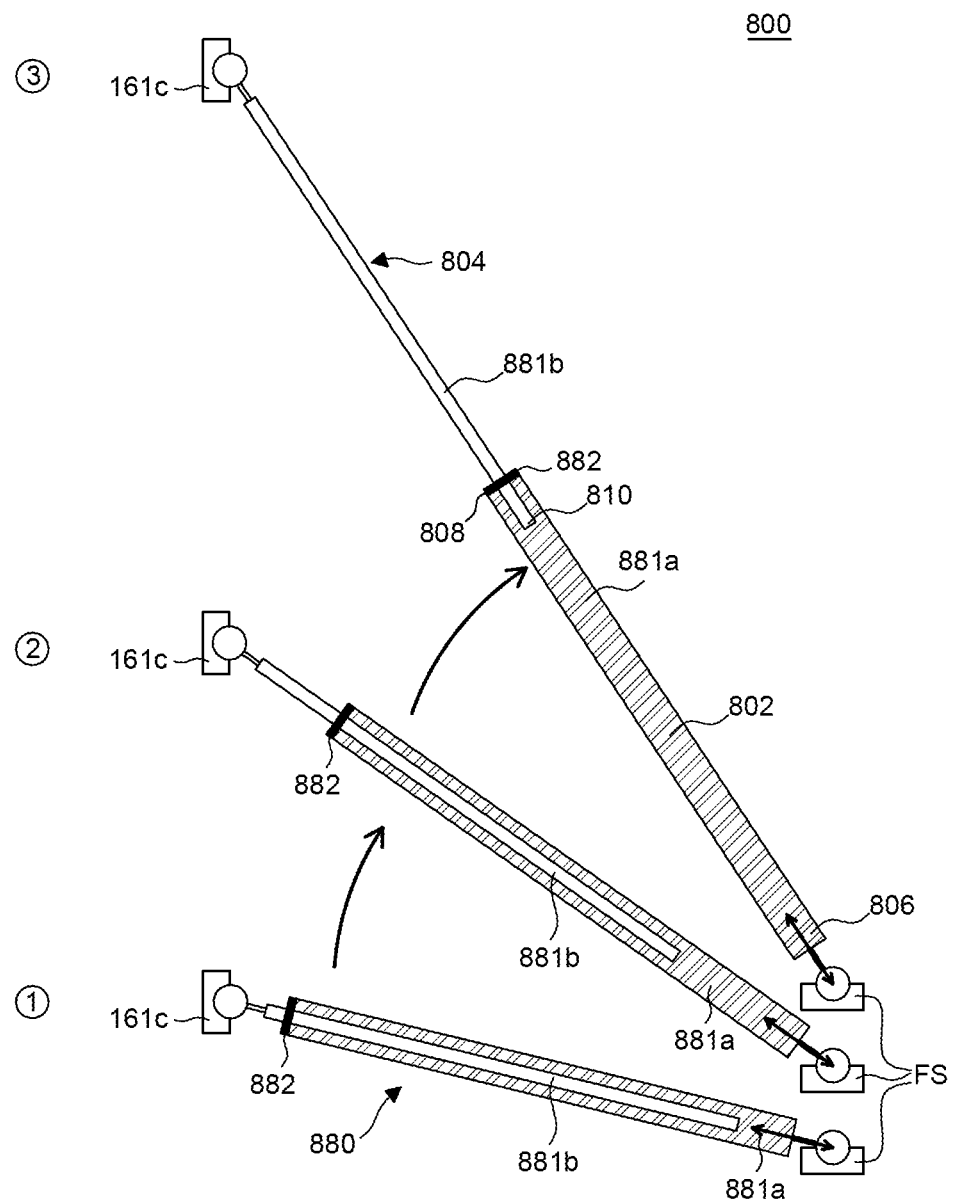
FIG. 8 is a cross-sectional view of a support rod of a display device according to an alternative embodiment of the present disclosure.

FIG. 8 is a cross-sectional view of a support rod 880 (which may be referred to herein as a support link 880) of a display device 800 according to an alternative embodiment of the present disclosure. The display device 800 of FIG. 8 differs from the display device 100 of FIGS. 1 to 7 with respect to the support link 880, among other differences. Certain features of the display device 800 are similar to display device 100 and as such, redundant description will be omitted. FIG. 8 is a cross-sectional view for explaining a process of manipulating a display unit of the display device 800 from a fully wound state to a fully unwound state. For the convenience of description, in FIG. 8, only the support link 880, a hinge unit 161c, and a fixing member FS are schematically illustrated, however it is to be appreciated that the support link 880 is interchangeable with the support link 180 and the display device 100 described herein.

Referring to FIG. 8, the support link 880 includes a plurality of rods 881. The plurality of rods 881 are configured to slide from adjacent rods, similar to the plurality of rods 181. For example, the plurality of rods 881 includes a first rod 881a and a second rod 881b. The first rod 881a includes a longitudinal bore 802, wherein a first diameter of the first rod 881a and the longitudinal bore 802 is greater than a second diameter of an outer surface 804 of the second rod 881b, such that the first rod 181a, and more specifically, the longitudinal bore 802 of the first rod 181a, slidably receives the second rod 881b in a nesting or telescoping arrangement. In other words, the second rod 881b has a smaller diameter than that of the first rod 881a and the longitudinal bore 802. As such, the second rod 881b slides between a first position received in the longitudinal bore 802 of the first rod 881a (see state (1) in FIG. 8) to a second position wherein the second rod 881b extends from the first rod 881a (see state (3) in FIG. 8). The plurality of rods 881 preferably have a hollow cylindrical shape, but the present disclosure is not limited thereto. Although FIG. 8 illustrates that the plurality of rods 881 includes two rods, the number of the plurality of rods 881 can be selected depending on the design and the present disclosure is therefore not limited thereto.

Referring to FIG. 8, the support link 880 further includes a compressor. The compressor is supplied with power from an external source and is configured to supply gas or fluid to the plurality of rods 881 of the support link 880. More specifically, the compressor adjusts a pneumatic pressure or a hydraulic pressure in the longitudinal bore 802 of the first rod 881a of the plurality of rods 881 of the support link 880, as indicated by arrows 806. Therefore, the length of the plurality of rods 881 of the support link 880, and of the support link 880 generally, may be adjusted by pneumatic pressure or hydraulic pressure. In one embodiment, the support link 880 is a linear actuator, such as a lift support strut with compressed gas contained in the first rod 881a for extending the second rod 881b. In such an embodiment, the motor 171 provides greater force than the linear actuator and as such, the motor 171 controls operation of the linear actuator.

Referring to FIG. 8, the support link 880 further includes a friction member 882. The friction member 882 is disposed at an end 808 of at least one of the plurality of rods 881 of the support link 880. Specifically, in one embodiment, the friction member 882 is disposed at the end 808 of a rod of the plurality of rods 881 which provides a space which receives an adjacent rod of the plurality of rods 881 in a telescoping arrangement. For example, in the illustrated embodiment, the friction member 882 is disposed at one end 808 of the first rod 881a, wherein the first rod 881a provides a space (e.g., the longitudinal bore 802) where the adjacent second rod 881b is slidably received. Moreover, the friction member 882, together with the first rod 881a and the second rod 881b, seals the longitudinal bore 802 that receives the second rod 881b such that the compressor is connected to the sealed space to adjust the second rod 881b via pneumatic or hydraulic pressure.

In one or more embodiments, the friction member 882 is disposed external to the first rod 881a and on the end 808 of the first rod 881a, while in other embodiments, the friction member 882 is disposed internal to the first rod 881a at the end 808, between the end 808 of the first rod 881a and an end 810 of the second rod 881b. Therefore, the friction member 882, together with the first rod 881a and the second rod 881b provides a sealed space connected to the compressor for adjusting the support link 880.

As shown in FIG. 8, when the display unit DP is fully wound, the support link 880 is in the state (1) wherein a majority of the second rod 881b is disposed in the first rod 881a and a portion of the second rod 881b extends from the first rod 881a. In other words, in the state (1), a first portion of the second rod 881b is received in the first rod 881a and a second portion of the second rod 881b extends from the first rod 881a. In an embodiment, the first portion corresponds to a majority of a length of the second rod 881b. In an alternative embodiment, the first portion is less than a majority of the length of the second rod 881b. In the state (1), the display unit DP is fully wound, such that the support link 880 has a minimum length.

With continued reference to FIG. 8, a state (2) of the support link 880 corresponds to a point in time when the display unit DP is manipulated from the fully wound state to the fully unwound state so that the overall length of the support link 880 is increased. In other words, the state (2) represents when the display unit DP is between the fully wound and the fully unwound states. In one or more embodiments, the compressor supplies gas or fluid to the sealed space (e.g. longitudinal bore 802) formed by the friction member 882, the first rod 881a, and the second rod 881b. As such, the compressor increases the pneumatic pressure or the hydraulic pressure of the sealed space formed by the friction member 882, the first rod 881a, and the second rod 881b and thus the second rod 881b slides to extend from the first rod 881a to increase the overall length of the support link 880. Therefore, the display unit DP is supported by the support link 880 as it is manipulated from the fully wound state to the fully unwound state.

FIG. 8 further illustrates a state (3) of the support link 880 in which the display unit DP is fully unwound. In state (3), the second rod 881b slides from the first rod 881a a maximum amount so that the support link 880 has a maximum length. That is, the compressor increases the pressure of the sealed space formed by the friction member 882, the first rod 881a, and the second rod 881b to a maximum via gas, air, or hydraulic fluid, and thus the second rod 881b slides to extend from the first rod 881a so that the support link 880 has the maximum length. Therefore, the display unit DP is supported by the support link 880 in the fully unwound state.

The process of manipulating the support link 880 back to the state (1) from the state (3) via the state (2) is a reverse process of the process described above of manipulating the support link 880 to the state (3) from the state (1) via the state (2). In sum, the display DP is wound and simultaneously, the compressor removes gas or fluid from the sealed space formed by the friction member 882, the first rod 881a, and the second rod 881b. Therefore, the compressor reduces the pneumatic pressure or the hydraulic pressure of the sealed space formed by the friction member 882, the first rod 881a, and the second rod 881b such that the second rod 881b slides into the first rod 881a.

Figure 9:
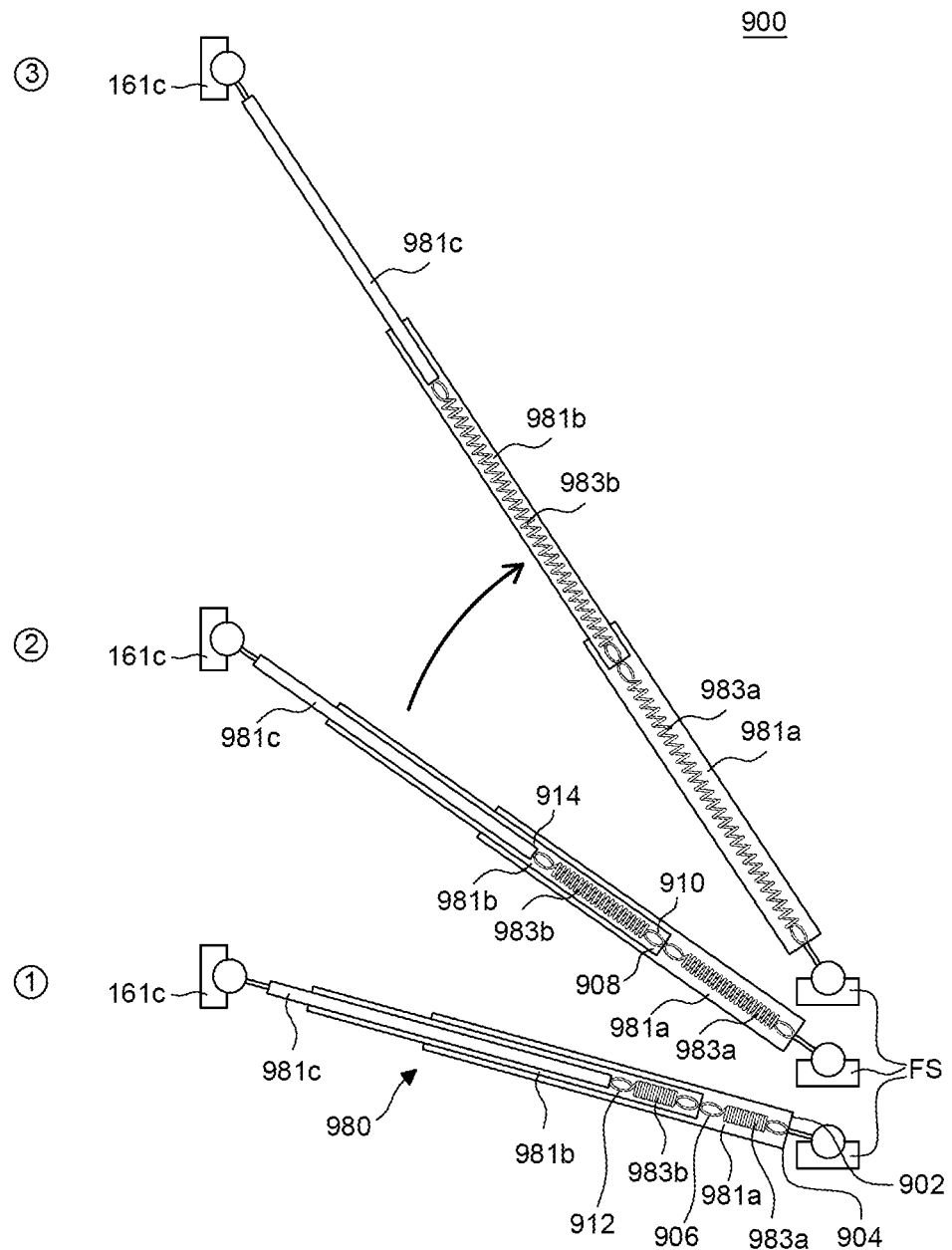
FIG. 9 is a cross-sectional view of a support rod of a display device according to an alternative embodiment of the present disclosure.

In the display device 800 according to one or more embodiments of the present disclosure, the compressor which adjusts a pressure in the plurality of rods 881 of the support link 880 is used to reduce overturning of the display unit DP caused when the display device 800 is fully unwound. For example, when the display device 800 is fully unwound, the display unit DP tends to overturn towards the front surface 102 of the display unit DP. In this embodiment, the support link 880 supports the rear surface 106 of the display unit DP to reduce or prevent overturning of the display unit DP. More specifically, the support link 880 generates a preferably equal and opposite supporting force to suppress a force that tends to overturn the display unit DP. Therefore, the pressure in the plurality of rods 881 is adjusted using the compressor connected to the inside of the plurality of rods 881 of the support link 880, so that the support link 880 reduces the likelihood of overturning of the display unit DP Support Link Including Elastic Member FIG. 9 is a cross-sectional view of a support link 980 of a display device 900 according to still another alternative embodiment of the present disclosure. One of the differences between the display device 900 of FIG. 9 and the display device 100 of FIGS. 1 to 7, among others, is the support link 980. Other components of the display device 900 are similar to the display device 100, and as such, redundant description will be omitted. For the convenience of description, in FIG. 9, only the support link 980 of the display device 900 is illustrated, although it is to be appreciated that the support link 980 is interchangeable with the support link 180 and the display device 100 described herein.

Referring to FIG. 9, the support link 980 includes an elastic member 983. Specifically, the elastic member 983 is disposed in at least one of the plurality of rods 981 of the support link 980 and fixed to one end of an adjacent rod of the plurality of rods 981. For example, a first elastic member 983a and a second elastic member 983b are disposed in a first rod 981a and a second rod 981b, respectively. In this case, a first end 902 of the first elastic member 983a is fixed to a first end 904 of the first rod 981a and a second end 906 of the first elastic member 983a is fixed to a first end 908 of the second rod 981b. Similarly, a first end 910 of the second elastic member 983b is fixed to the first end 908 of the second rod 981b and a second end 912 of the second elastic member 983b is fixed to a first end 914 of the third rod 981c. In one embodiment, the elastic member 983 is a spring, while in other embodiments, the elastic member 983 is a different material or structure with elastic properties and as such, the present disclosure is not limited thereto.

Referring to FIG. 9, the elastic member 983 of the support link 980 extends as the display device 900 is unwound. As the elastic member 983 extends, an elastic force generated by the elastic member 983 increases to reduce overturning of the display unit DP when the display device 900 is unwound.

Referring to FIG. 9, the support link 980 is illustrated in a state (1), which corresponds to when the display unit DP is fully wound. In the state (1), most of the second rod 981b is disposed in the first rod 981a and a part of the second rod 981b which is not disposed in the first rod 981a extends from the first rod 981a. Further, most of the third rod 981c is disposed in the second rod 981b and a part of the third rod 981c which is not disposed in the second rod 981b extends from the second rod 981b. In the state (1), the display unit DP is fully wound, so that the support link 980 has a minimum length. Further, the elastic member 983 disposed in the plurality of rods 981 of the support link 980 is disposed in a relaxed or un-stretched state. That is, the first elastic member 983a disposed in the first rod 981a and the second elastic member 983b disposed in the second rod 981b are in an initial state wherein the elastic members 983a, 983b are at rest and are not stretched.

Referring to FIG. 9, the support link 980 is illustrated in a state (2) which corresponds to a point in time wherein the display unit DP is manipulated from the fully wound state to the fully unwound state to increase the length of the support link 980. In state (2), the second rod 981b slides from the first rod 981a and the third rod 981c slides from the second rod 981b. Therefore, as the second rod 981b slides from the first rod 981a, the first elastic member 983a disposed in the first rod 981a is stretched and as the third rod 981c slides from the second rod 981b, the second elastic member 983b disposed in the second rod 981b is stretched. Therefore, the display unit DP is supported by the elastic force of the elastic member 983 as the display unit DP is unwound from the wound state to the unwound state.

Referring to FIG. 9, the support link 980 is illustrated in a state (3), which corresponds to when the display unit DP is fully unwound. In the state (3), the second rod 981b slides from the first rod 981a a maximum amount and the third rod 981c slides from the second rod 981b a maximum amount so that the support link 980 has a maximum length. As the second rod 981b slides from the first rod 981a to the maximum amount, the first elastic member 983a disposed in the first rod 981a is stretched to a maximum length and as the third rod 981c slides from the second rod 981b to the maximum amount, the second elastic member 983b disposed in the second rod 981b is stretched to a maximum length. Therefore, the display unit DP is supported by the elastic force of the elastic member 983 when the display unit DP is in the fully unwound state.

In the display device 900 according to one or more embodiments of the present disclosure, the elastic member 983 is disposed in the plurality of rods 981 of the support link 980 to reduce overturning of the display unit DP caused when the display device 900 is fully unwound. For example, when the display device 900 is fully unwound, the display unit DP is prone to overturn towards the front surface 102 of the display unit DP. In this case, the support link 980 supports the rear surface 106 of the display unit DP to reduce overturning of the display unit DP. For example, the support link 980 provides a supporting force sufficient to suppress overturning of the display unit DP via the plurality of rods 981 of the support link 980. Moreover, the elastic member 983 is disposed in the plurality of rods 981 of the support link 980 to provide an elastic force in a first direction relative to the rear surface 106 of the display unit DP, wherein the first direction is, at least in part, opposite a second direction corresponding to the overturning force and as such, the elastic member 983 further reduces a risk of overturning of the display unit DP.

Support Link Connected to Plurality of Links

Figure 10:
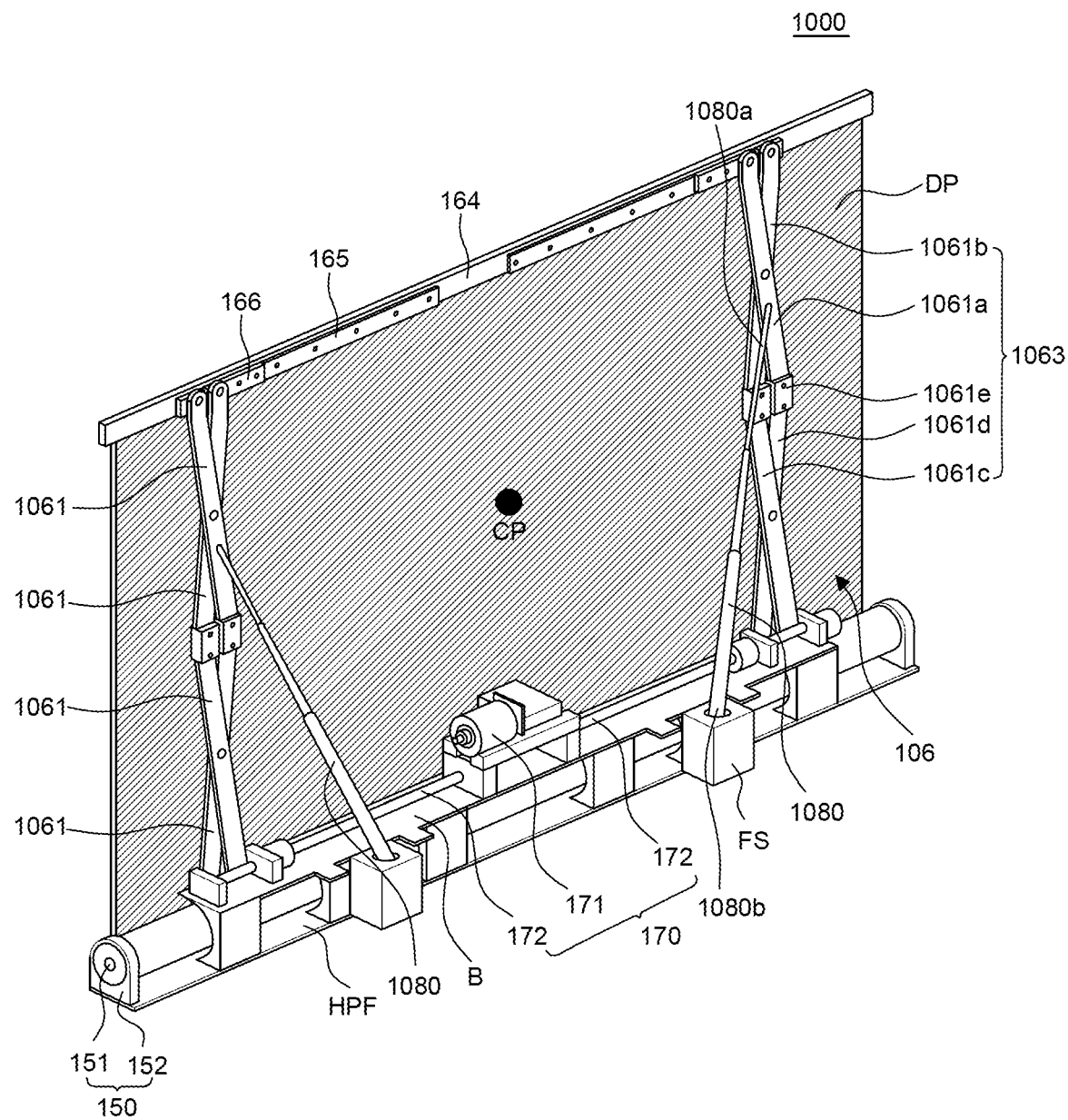
FIG. 10 is a perspective view of a display device according to an alternative embodiment of the present disclosure.

FIG. 10 is a perspective view of a display device 1000 according to an alternative embodiment of the present disclosure. One of the differences, among others, between the display device 1000 of FIG. 10 and the display devices 100, 800, and 900 of FIGS. 1 to 9 is a support rod 1080 (which may be referred to herein as a support link 1080) and a link assembly 1063 (which may be referred to herein as a link unit 1063). Certain other features of the display device 1000 are the same as the display devices 100, 800, 900, and as such, redundant description will be omitted.

Referring to FIG. 10, the display device 1000 includes the link unit 1063, which includes a plurality of links 1061 coupled to each other. In one embodiment, the plurality of links 1061 includes first, second, third, and fourth links 1061a, 1061b, 1061c, 1061d coupled to each other, wherein the first and second links 1061a, 1061b and the third and fourth links 1061c, 1061d, are rotatably coupled to each with hinges 1061e. The support link 1080 is connected to the first link 1061a, which is disposed further from the rear surface 106 of the display unit DP than the second link 1061b. Specifically, a first end 1080a of the support link 1080 is connected to the first link 1061a of the link unit 1061 and a second end 1080b of the support link 1080 is connected to the fixing member FS.

For example, as illustrated in FIG. 10, the first end 1080a of the support link 1080 is connected to the first link 1061a disposed in an upper portion of the link unit 1061 relative to the plurality of links 1061. To facilitate the connection between the support link 1080 and the first link 1061a, a portion of the first link 1061a connected to the first end 1080a of the support link 1080 includes a groove which accommodates a ball bearing structure of the support link 1080. However, the present disclosure is not limited thereto. For example, in an alternative embodiment, the first end 1080a of the support link 1080 is connected to the second link 161b, which is disposed further from the rear surface 106 of the display unit DP than the first link 1061a when the display unit DP is fully wound.

In one embodiment, the first end 1080a of the support link 1080 is disposed higher than a center CP of the display unit DP relative to a height of the display device 1000 when the display unit DP is fully unwound. When the first end 1080a of the support link 1080 is disposed lower than the center CP of the display unit DP when the display unit DP is fully unwound, a force of the support link 1080 which supports the display unit DP may be insufficient. Therefore, a height of the position where the support link 1080 and the link unit 1061 are connected relative to the center CP of the display unit is increased to increase a supporting force of the support link 1080. In other words, it is preferable that the first end 1080a of the support link 1080 is above the center CP of the display unit DP. However, in one embodiment where the first end 1080a of the support link 1080 is below the center CP of the display unit DP, the force provided by the support link 1080 can be increased, such as through use of hydraulic or pneumatic pressure, or elastic members, among others, as above, to provide a sufficient force.

In the display device 1000 according to one or embodiments of the present disclosure, the first end 1080a of the support link 1080 is connected to the first link 1061a, which is disposed further from the rear surface 106 when the display unit DP is fully wound relative to the second link 1061b of the plurality of links 1061 and the first end 1080a of the support link 1080 is disposed higher than the center CP of the display unit DP when the display unit DP is fully unwound. Therefore, because the support link 1080 supports an upper area of the display unit DP, the support link 1080 supports the display unit DP with a sufficient force and reduces the likelihood of overturning of the display unit DP. Further, when the display device 1000 is wound, interference with the link unit 1061 is reduced. Specifically, when the support link 1080 is connected to a link that is closer to the rear surface 106 of the display unit DP, such as second link 1061b in FIG. 10, and the display unit DP is fully wound, the connection of the support link 1080 and the link unit 1061 may result in interference with the first link 1061a. Therefore, the first end 1080a of the support link 1080 is preferably connected to a link which is disposed further from the rear surface 106 relative to the plurality of links 1061 such that when the display unit DP is fully wound, interference between the plurality of links 1063 of the link unit 1061 and the support link 1080 is reduced.

Support Link Connected to Head Bar

Figure 11:
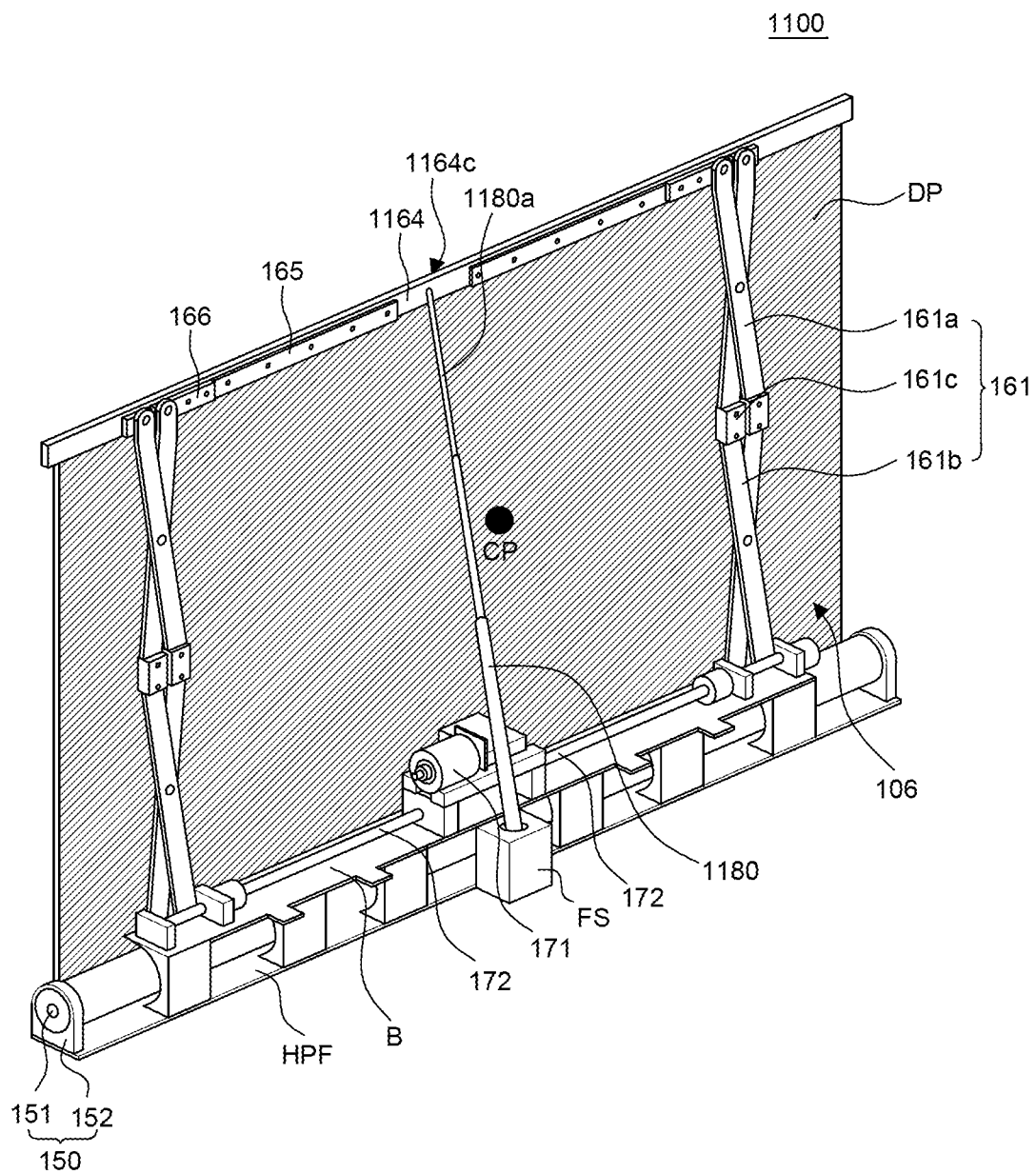
FIG. 11 is a perspective view of a display device according to an alternative embodiment of the present disclosure.

FIG. 11 is a perspective view of a display device 1100 according to one or more embodiments of the present disclosure. One of the differences, among others, between the display device 1100 of FIG. 11 and the display devices 100, 800, and 900 of FIGS. 1 to 9 is with respect to a support rod 1180 (which may be referred to herein as a support link 1180) and a head bar 1164. Other components of the display device 1100 are the same as the display devices 100, 800, 900, and as such, redundant description will be omitted.

Referring to FIG. 11, the support link 1180 is connected to the head bar 1164. Specifically, a first end 1180*a* of the support link 1180 is connected to a center portion 1164*c* of the head bar 1164 and a second end 1180*b* is connected to the fixing member FS. In one embodiment, the center portion 1164*c* of the head bar 1164 refers to a portion of the head bar 1164 between the slide rails 165. The center portion 1164*c* of the head bar 1164 includes a groove for accommodating a ball bearing structure of the first end 1180*a* of the support link 1180 to facilitate the connection between the first end 1180*a* of the support link 1180 and the head bar 1164. Therefore, when the display device 1100 is unwound, the head bar 1164 is lifted, and an overall length of the support link 1180 is increased. When the display device 1100 is wound, the head bar 1164 is lowered and the overall length of the support link 1180 is correspondingly reduced. As such, the support link 1180 supports the rear surface 106 of the display unit DP as the display unit DP is wound and unwound. In one embodiment, the first end 1180*a* of the support link 1180 is disposed higher than a center CP of the display unit DP when the display unit DP is fully unwound relative to the housing unit HP or a base surface on which the display device 1100 rests. In one embodiment, because the support link 1180 is disposed at the center portion 1164*c* of the head bar 1164, only one support link 1180 may provide sufficient force to stabilize the display unit DP, but the present disclosure is not limited thereto.

In an alternative embodiment of the present disclosure, the support link 1180 is connected to the center portion 1164*c* of the head bar 1164 to support the rear surface 106 of the display unit DP with one support link 1180. Specifically, when only one support link 1180 is disposed in the display device 1100, the structure of the display device 1100 is simplified while also maintaining sufficient support of the rear surface 106 of the display unit DP. Accordingly, the support link 1180 is connected to the center portion 1164*c* of the head bar 1164 to simplify the structure of the display device 1100 while also supporting the display unit DP when the display device 1100 is wound or unwound.

Support Link Including Sliding Structure

Figure 12:
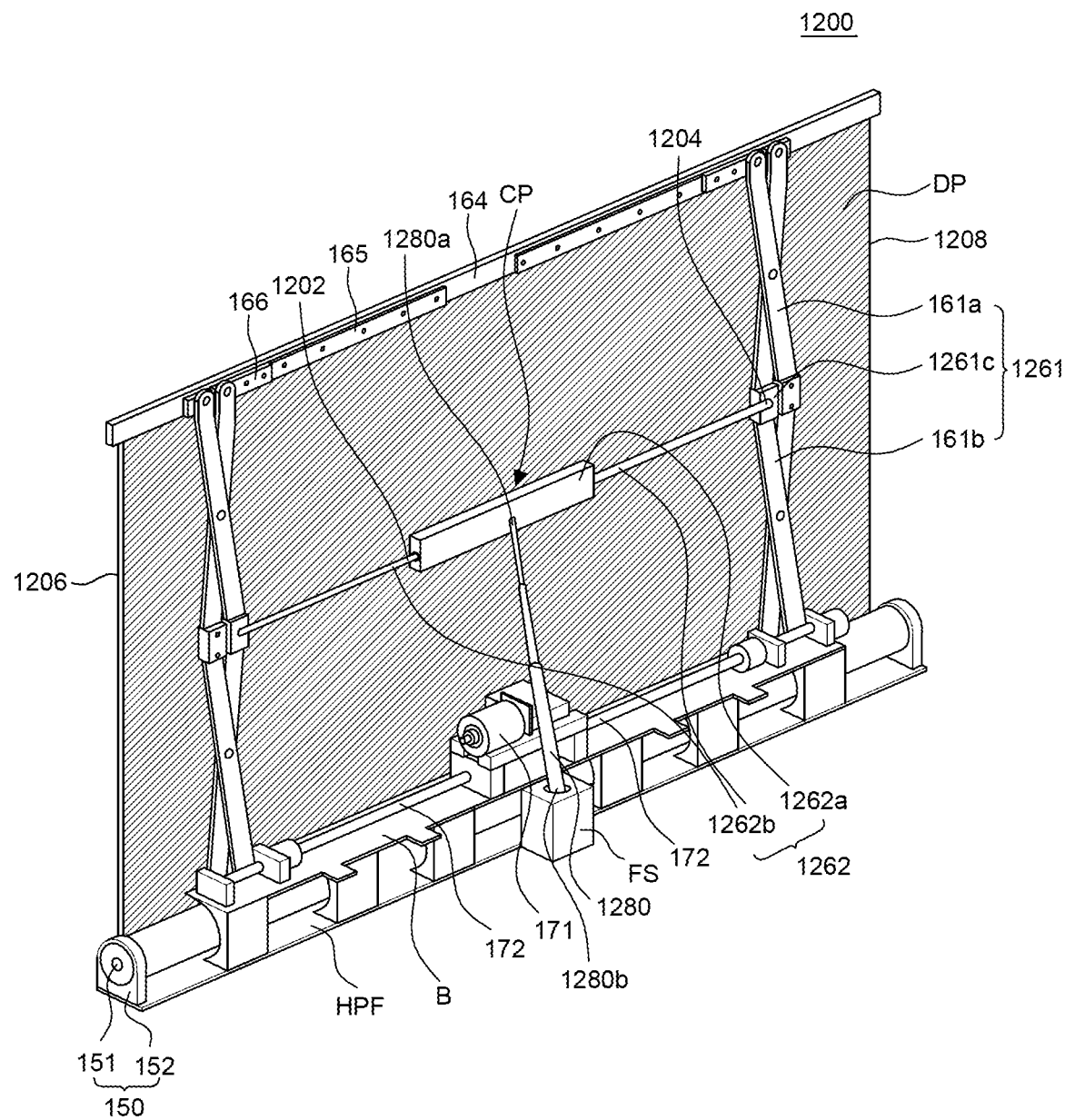
FIG. 12 is a perspective view of a display device according to an alternative embodiment of the present disclosure.

FIG. 12 is a perspective view of a display device 1200 according to one or more embodiments of the present disclosure. One of the differences between the display device 1200 of FIG. 12 and the display devices 100, 800, and 900 of FIGS. 1 to 9 is with respect to a support link 1280, a link assembly 1261 (which may be referred to herein as a link unit 1261), and a slide structure 1262. Certain other features of the display device 1200 are the same, such that redundant description has been omitted.

Referring to FIG. 12, the link unit 1261 includes a sliding structure or assembly 1262. The sliding structure 1262 connects hinge units 1261*c* of the link units 1261 to each other. For example, the sliding structure 1262 includes a first member 1261*a* and a plurality of second members 1261*b*. The plurality of second members 1261*b* slide in opposite directions relative the first member 1261*a* when the display unit DP is manipulated from the wound state to the unwound state shown in FIG. 12. In one embodiment, a first end 1202 end of each second member 1261*b* is connected to the first member 1261*a* and received inside of, or internal to, the first member 1261*a*. Further, a second end 1204 of each of the plurality of second members 1261*b* is connected to the hinge unit 1261*c* of the link unit 1261 disposed at a left side 1206 of the display unit DP (in the orientation shown in FIG. 12) and a hinge unit 1261*c* of the link unit 1261 disposed at a right side 1208 of the display unit DP (in the orientation shown in FIG. 12). Therefore, when the display device 1200 is fully wound, the plurality of second members 1261*b* is disposed in the first member 1261*a* and as the display device 1200 is unwound, the plurality of second members 1261*b* slide to extend from the first member 1261*a* in different, opposite directions. Further, when the display device 1200 is fully unwound, the sliding structure 1262, and more specifically, the plurality of second members 1261*b*, slide such that a length of the sliding structure 1261 is at a maximum.

Referring to FIG. 12, the support link 1280 is connected to the sliding structure 1262. Specifically, a first end 1280*a* of the support link 1280 is connected to the sliding structure 1262 and a second end 1280*b* is connected to the fixing member FS. Although it is illustrated that the support link 1280 is connected to a center portion CP of the sliding structure 1262, a location where the support link 1280 is connected to the sliding structure 1262 can be selected according to the design, and is therefore not limited to the illustrated embodiment.

In the display device 1200 according to the present disclosure, the sliding structure 1262 of the link unit 1261 is connected between the hinge units 1261*c* of the link units 1261 to reduce overturning of the display unit DP when the display device 1200 is unwound. Specifically, when the display device 1200 is unwound, the display unit DP may be prone to overturning. The link unit 1261 and the sliding structure 1262 which connects the hinge units 1261*c* to each other support the display unit DP when the display device 1200 is unwound, which reduces the likelihood of overturning of the display unit DP. Further, the support link 1280 is connected to the slide structure 1262 to more effectively support the display unit DP and thus when the display device 1200 is fully unwound, overturning of the display unit DP is reduced.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a roller;
   a flexible display assembly coupled to the roller, wherein the flexible display assembly is manipulatable between a rolled configuration in which the flexible display assembly is wound about the roller and an unrolled configuration in which the flexible display assembly is unwound from the roller;
   a head bar coupled to the flexible display assembly; and
   a support rod directly connected to the head bar.

2. The device of claim 1 wherein the support rod includes a plurality of rods, a first one of the plurality of rods telescopically received in a second one of the plurality of rods, the first one of the plurality of rods configured to extend and collapse relative to the second one of the plurality of rods.

3. The device of claim 2 wherein the support rod is extendible between a collapsed configuration corresponding to the rolled configuration of the flexible display assembly and an extended configuration corresponding to the unrolled configuration of the flexible display assembly, wherein in the collapsed configuration, a majority of a length of the first one of the plurality of rods is received in the second one of the plurality of rods, and wherein in the extended configuration, the majority of the first one of the plurality of rods extends from the second one of the plurality of rods.

4. The device of claim 2 further comprising:
   a friction member coupled to the second one of the plurality of rods and in contact with the first one of the plurality of rods.

5. The device of claim 1 further comprising:
   a link assembly coupled to the head bar and including a plurality of links;
   a slide rail coupled to the head bar; and
   a slider on the slide rail, the slider being coupled to a first one of the plurality of links, the first one of the plurality of links configured to translate along the slide rail.

6. The device of claim 1 wherein the support rod further includes a plurality of rods, a first one of the plurality of rods telescopically received in a second one of the plurality of rods, each of the first one and the second one of the plurality of rods including an end, the support rod further including an elastic member coupled between the end of the first one of the plurality of rods and the end of the second one of the plurality of rods.

7. A system, comprising:
   a roller;
   a display assembly coupled to the roller;
   a head bar coupled to the display assembly;
   a first link assembly coupled to the head bar, wherein the first link assembly includes a first plurality of links; and
   a first support rod coupled to the head bar.

8. The system of claim 7 wherein the first plurality of links includes a first one of the first plurality of links coupled to the head bar and the first support rod coupled to the first one of the first plurality of links.

9. The system of claim 7 further comprising:
   a second link assembly coupled to the head bar; and
   a slide structure assembly coupled between the first and second link assemblies, wherein the slide structure assembly includes a first member and a plurality of second members, each of the plurality of second members configured to slide to be received in the first member or to extend from the first member.

10. The system of claim 9 wherein the second link assembly includes a second plurality of links with a first one of the second plurality of links coupled to the head bar, the system further comprising:
    a second support rod coupled to the first one of the second plurality of links.

11. The system of claim 7 further comprising:
    a slide rail coupled to the head bar;
    a first slider on the slide rail and coupled to the first one of the first plurality of links, the first one of the first plurality of links configured to translate along the slide rail; and
    a second slider on the slide rail and coupled to the first one of the second plurality of links, the first one of the second plurality of links configured to translate along the slide rail.

12. A device, comprising:
    a roller;
    a flexible display assembly coupled to the roller, the flexible display assembly configured to be wound and unwound around the roller, the flexible display assembly having a center; and
    a support rod coupled to the flexible display assembly,
    wherein a first end of the support rod is at a first height relative to the roller that is greater than a second height from the center of the flexible display assembly to the roller in response to the flexible display assembly being fully unwound from the roller.

13. The device of claim 12 wherein the flexible display assembly includes a head bar and at least one link, the support rod coupled to the head bar.

14. The device of claim 12 wherein the flexible display assembly includes a head bar and at least one link, the support rod coupled to the at least one link.

15. The device of claim 12 wherein the flexible display assembly includes a head bar, at least one link, and a slide structure coupled to the at least one link, the support rod coupled to the slide structure.

16. The device of claim 15 wherein the at least one link includes a first link and a second link, the slide structure coupled between the first link and the second link.

* * * * *